(12) United States Patent
Wu et al.

(10) Patent No.: US 12,355,816 B2
(45) Date of Patent: *Jul. 8, 2025

(54) AUTOMATED PREEMPTIVE POLYMORPHIC DECEPTION

(71) Applicant: ExtraHop Networks, Inc., Seattle, WA (US)

(72) Inventors: Xue Jun Wu, Seattle, WA (US); Bhushan Prasad Khanal, Seattle, WA (US); Swagat Dasgupta, Kirkland, WA (US); Changhwan Oh, Seattle, WA (US); J. Braund, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,801

(22) Filed: Sep. 30, 2024

(65) Prior Publication Data

US 2025/0023914 A1 Jan. 16, 2025

Related U.S. Application Data

(63) Continuation of application No. 17/516,529, filed on Nov. 1, 2021, now Pat. No. 12,107,888, which is a (Continued)

(51) Int. Cl.
*H04L 9/40* (2022.01)
*H04L 43/062* (2022.01)
(Continued)

(52) U.S. Cl.
CPC ........ *H04L 63/1491* (2013.01); *H04L 43/062* (2013.01); *H04L 43/08* (2013.01);
(Continued)

(58) Field of Classification Search
CPC ............ H04L 63/1408–1425; H04L 63/1433; H04L 63/1441; H04L 63/1491; H04L 63/20
See application file for complete search history.

(56) References Cited

U.S. PATENT DOCUMENTS 5,027,269 A 6/1991 Grant et al.
5,430,727 A 7/1995 Callon et al.
(Continued)

FOREIGN PATENT DOCUMENTS

AU 2003287262 A1 5/2004
AU 2003287262 A8 5/2004
(Continued)

OTHER PUBLICATIONS

Office Communication for U.S. Appl. No. 13/831,908 mailed Jan. 13, 2014, 31 Pages.
(Continued)

*Primary Examiner* — Kevin Bechtel
(74) *Attorney, Agent, or Firm* — John W. Branch; Branch Partners PLLC

(57) ABSTRACT

Embodiments are directed to monitoring network traffic using network monitoring computers (NMCs). Anomalous events may be classified based on the monitored network traffic and attack models such that the classification determines that targets of the anomalous events may be currently subject to attacks by entities communicating on the networks. A honeypot trap may be provided in the networks based on the classified events such that the honeypot trap mimics characteristics of the targets. The portions of the network traffic associated with the honeypot trap may be monitored. Characteristics of the attacks may be determined based on the monitored portions of network traffic. Reports that include information based on the characteristics of the attacks may be generated.

20 Claims, 12 Drawing Sheets

Related U.S. Application Data continuation of application No. 16/718,050, filed on Dec. 17, 2019, now Pat. No. 11,165,823.

(51) Int. Cl.
*H04L 43/08* (2022.01)
*H04L 43/12* (2022.01)

(52) U.S. Cl.
CPC .......... *H04L 43/12* (2013.01); *H04L 63/1416* (2013.01); *H04L 63/1425* (2013.01); *H04L 63/1433* (2013.01)

(56) References Cited

U.S. PATENT DOCUMENTS

| | | |
|---|---|---|
| 5,541,995 A | 7/1996 | Normile et al. |
| 5,548,646 A | 8/1996 | Aziz et al. |
| 5,715,464 A | 2/1998 | Crump et al. |
| 5,787,237 A | 7/1998 | Reilly |
| 5,802,599 A | 9/1998 | Cabrera et al. |
| 5,835,726 A | 11/1998 | Shwed et al. |
| 5,857,188 A | 1/1999 | Douglas |
| 5,867,661 A | 2/1999 | Bittinger et al. |
| 5,928,363 A | 7/1999 | Ruvolo |
| 6,040,834 A | 3/2000 | Jain et al. |
| 6,058,429 A | 5/2000 | Ames et al. |
| 6,141,686 A | 10/2000 | Jackowski et al. |
| 6,263,049 B1 | 7/2001 | Kuhn |
| 6,321,338 B1 | 11/2001 | Porras et al. |
| 6,385,729 B1 | 5/2002 | Digiorgio et al. |
| 6,401,150 B1 | 6/2002 | Reilly |
| 6,405,250 B1 | 6/2002 | Lin et al. |
| 6,412,000 B1 | 6/2002 | Riddle et al. |
| 6,526,044 B1 | 2/2003 | Cookmeyer, II et al. |
| 6,560,636 B2 | 5/2003 | Cohen et al. |
| 6,597,777 B1 | 7/2003 | Ho |
| 6,636,838 B1 | 10/2003 | Perlman et al. |
| 6,704,311 B1 | 3/2004 | Chuah et al. |
| 6,704,874 B1 | 3/2004 | Porras et al. |
| 6,760,775 B1 | 7/2004 | Anerousis et al. |
| 6,765,909 B1 | 7/2004 | Sen et al. |
| 6,789,203 B1 | 9/2004 | Belissent |
| 6,789,206 B1 | 9/2004 | Wierzbicki et al. |
| 6,807,156 B1 | 10/2004 | Veres et al. |
| 6,807,565 B1 | 10/2004 | Dodrill et al. |
| 6,883,015 B1 | 4/2005 | Geen et al. |
| 6,901,517 B1 | 5/2005 | Redmore |
| 6,944,599 B1 | 9/2005 | Vogel et al. |
| 6,948,060 B1 | 9/2005 | Ramanathan |
| 6,968,554 B1 | 11/2005 | Macdonald et al. |
| 6,999,729 B2 | 2/2006 | Wandel |
| 7,042,888 B2 | 5/2006 | Berggreen et al. |
| 7,047,303 B2 | 5/2006 | Lingafelt et al. |
| 7,089,326 B2 | 8/2006 | Boucher et al. |
| RE39,360 E | 10/2006 | Aziz et al. |
| 7,133,365 B2 | 11/2006 | Klinker et al. |
| 7,143,153 B1 | 11/2006 | Black et al. |
| 7,177,930 B1 | 2/2007 | Lopresti |
| 7,181,769 B1 | 2/2007 | Keanini et al. |
| 7,193,968 B1 | 3/2007 | Kapoor et al. |
| 7,222,366 B2 | 5/2007 | Bruton, III et al. |
| 7,313,141 B2 | 12/2007 | Kan et al. |
| 7,342,897 B1 | 3/2008 | Nader et al. |
| 7,424,532 B1 | 9/2008 | Subbiah |
| 7,454,499 B2 | 11/2008 | Cantrell et al. |
| 7,457,870 B1 | 11/2008 | Lownsbrough et al. |
| 7,474,654 B2 | 1/2009 | Guru |
| 7,480,292 B2 | 1/2009 | Busi et al. |
| 7,509,680 B1 | 3/2009 | Sallam |
| 7,535,906 B2 | 5/2009 | Engbersen et al. |
| 7,543,146 B1 | 6/2009 | Karandikar et al. |
| 7,545,499 B2 | 6/2009 | Overbeck et al. |
| 7,554,983 B1 | 6/2009 | Muppala |
| 7,561,517 B2 | 7/2009 | Klinker et al. |
| 7,580,356 B1 | 8/2009 | Mishra et al. |
| 7,594,273 B2 | 9/2009 | Keanini et al. |
| 7,602,731 B2 | 10/2009 | Jain |
| 7,606,706 B1 | 10/2009 | Rubin et al. |
| 7,609,630 B2 | 10/2009 | Gobeil |
| 7,619,988 B2 | 11/2009 | Shimada et al. |
| 7,620,986 B1 | 11/2009 | Jagannathan et al. |
| 7,636,305 B1 | 12/2009 | Taylor et al. |
| 7,639,613 B1 | 12/2009 | Ghannadian et al. |
| 7,644,150 B1 | 1/2010 | Nucci et al. |
| 7,660,883 B2 | 2/2010 | Fowlow |
| 7,724,905 B2 | 5/2010 | Bleumer et al. |
| 7,739,497 B1 | 6/2010 | Fink et al. |
| 7,774,456 B1 | 8/2010 | Lownsbrough et al. |
| 7,809,829 B2 | 10/2010 | Kelly et al. |
| 7,810,151 B1 | 10/2010 | Guruswamy |
| 7,817,549 B1 | 10/2010 | Kasralikar et al. |
| 7,849,502 B1 | 12/2010 | Bloch et al. |
| 7,864,764 B1 | 1/2011 | Ma et al. |
| 7,916,652 B1 | 3/2011 | Lima et al. |
| 7,917,647 B2 | 3/2011 | Cooper et al. |
| 7,936,682 B2 | 5/2011 | Singh et al. |
| 7,937,755 B1 | 5/2011 | Guruswamy |
| 7,944,822 B1 | 5/2011 | Nucci et al. |
| 7,975,139 B2 | 7/2011 | Coulier |
| 7,979,555 B2 | 7/2011 | Rothstein et al. |
| 7,979,694 B2 | 7/2011 | Touitou et al. |
| 8,040,798 B2 | 10/2011 | Chandra et al. |
| 8,079,083 B1 | 12/2011 | Bennett et al. |
| 8,102,783 B1 | 1/2012 | Narayanaswamy et al. |
| 8,107,397 B1 | 1/2012 | Bagchi et al. |
| 8,125,908 B2 | 2/2012 | Rothstein et al. |
| 8,145,633 B1 | 3/2012 | Manolis et al. |
| 8,185,953 B2 | 5/2012 | Rothstein et al. |
| 8,194,542 B2 | 6/2012 | Vaeaenaenen et al. |
| 8,332,765 B2 | 12/2012 | Ergan et al. |
| 8,352,725 B1 | 1/2013 | O'toole, Jr. |
| 8,402,540 B2 | 3/2013 | Kapoor et al. |
| 8,411,677 B1 | 4/2013 | Colloff |
| 8,418,249 B1 | 4/2013 | Nucci et al. |
| 8,443,190 B2 | 5/2013 | Breton et al. |
| 8,457,127 B2 | 6/2013 | Eastham et al. |
| 8,494,985 B1 | 7/2013 | Keralapura et al. |
| 8,504,456 B2 | 8/2013 | Griffin et al. |
| 8,533,254 B1 | 9/2013 | Whitson, Jr. et al. |
| 8,555,383 B1 | 10/2013 | Marshall et al. |
| 8,561,177 B1 | 10/2013 | Aziz et al. |
| 8,577,817 B1 | 11/2013 | Keralapura et al. |
| 8,578,024 B1 | 11/2013 | Keralapura et al. |
| 8,601,531 B1 | 12/2013 | Zolfonoon et al. |
| 8,613,089 B1 | 12/2013 | Holloway et al. |
| 8,619,579 B1 | 12/2013 | Rothstein et al. |
| 8,621,615 B2 | 12/2013 | Zhao |
| 8,626,912 B1 | 1/2014 | Rothstein et al. |
| 8,627,422 B2 | 1/2014 | Hawkes et al. |
| 8,635,441 B2 | 1/2014 | Frenkel et al. |
| 8,667,151 B2 | 3/2014 | Mizikovsky et al. |
| 8,699,357 B2 | 4/2014 | Deshpande et al. |
| 8,707,440 B2 | 4/2014 | Gula et al. |
| 8,744,894 B2 | 6/2014 | Christiansen et al. |
| 8,782,393 B1 | 7/2014 | Rothstein et al. |
| 8,817,655 B2 | 8/2014 | Szabo et al. |
| 8,843,627 B1 | 9/2014 | Baldi et al. |
| 8,848,744 B1 | 9/2014 | Rothstein et al. |
| 8,861,397 B2 | 10/2014 | Kind et al. |
| 8,867,343 B2 | 10/2014 | Rothstein et al. |
| 8,959,643 B1 | 2/2015 | Invernizzi et al. |
| 8,964,548 B1 | 2/2015 | Keralapura et al. |
| 8,971,196 B2 | 3/2015 | Degioanni et al. |
| 9,003,065 B2 | 4/2015 | Rothstein et al. |
| 9,026,467 B2 | 5/2015 | Bammi et al. |
| 9,036,493 B2 | 5/2015 | Degioanni et al. |
| 9,038,178 B1 | 5/2015 | Lin |
| 9,049,216 B2 | 6/2015 | Mccanne et al. |
| 9,054,952 B2 | 6/2015 | Rothstein et al. |
| 9,083,740 B1 | 7/2015 | Ma et al. |
| 9,094,288 B1 | 7/2015 | Nucci et al. |
| 9,094,326 B2 | 7/2015 | Sundararajan et al. |
| 9,152,808 B1 | 10/2015 | Ramalingam et al. |
| 9,158,604 B1 | 10/2015 | Christodorescu et al. |

(56) References Cited

U.S. PATENT DOCUMENTS

| | | |
|---|---|---|
| 9,166,994 B2 | 10/2015 | Ward et al. |
| 9,176,838 B2 | 11/2015 | Li et al. |
| 9,183,573 B2 | 11/2015 | Tseng |
| 9,189,318 B2 | 11/2015 | Li et al. |
| 9,191,288 B2 | 11/2015 | Rothstein et al. |
| 9,191,400 B1 | 11/2015 | Ptasinski et al. |
| 9,203,865 B2 | 12/2015 | Linden et al. |
| 9,210,135 B2 | 12/2015 | Rothstein et al. |
| 9,264,288 B1 | 2/2016 | Arora et al. |
| 9,300,554 B1 | 3/2016 | Kosai et al. |
| 9,323,426 B2 | 4/2016 | Yang |
| 9,338,147 B1 | 5/2016 | Rothstein et al. |
| 9,357,410 B2 | 5/2016 | Nedeltchev et al. |
| 9,367,687 B1 | 6/2016 | Warshenbrot |
| 9,369,479 B2 | 6/2016 | Lin |
| 9,378,361 B1 | 6/2016 | Yen et al. |
| 9,380,489 B2 | 6/2016 | Kotecha et al. |
| 9,391,866 B1 | 7/2016 | Martin et al. |
| 9,400,871 B1 | 7/2016 | Hewinson |
| 9,401,925 B1 | 7/2016 | Guo et al. |
| 9,426,036 B1 | 8/2016 | Roy |
| 9,430,646 B1 | 8/2016 | Mushtaq et al. |
| 9,432,430 B1 | 8/2016 | Klenz |
| 9,460,299 B2 | 10/2016 | Weiss et al. |
| 9,461,875 B2 | 10/2016 | Groat et al. |
| 9,479,405 B1 | 10/2016 | Tongaonkar et al. |
| 9,483,742 B1 | 11/2016 | Ahmed |
| 9,516,053 B1 | 12/2016 | Muddu et al. |
| 9,531,736 B1 | 12/2016 | Torres et al. |
| 9,565,202 B1 | 2/2017 | Kindlund et al. |
| 9,565,203 B2 | 2/2017 | Bernstein et al. |
| 9,584,381 B1 | 2/2017 | Leone |
| 9,591,015 B1 | 3/2017 | Amin et al. |
| 9,621,443 B2 | 4/2017 | Kosai et al. |
| 9,621,523 B2 | 4/2017 | Rothstein et al. |
| 9,654,485 B1 | 5/2017 | Neumann |
| 9,654,503 B1 | 5/2017 | Kowalyshyn |
| 9,660,879 B1 | 5/2017 | Rothstein et al. |
| 9,692,658 B2 | 6/2017 | Guo et al. |
| 9,705,895 B1 | 7/2017 | Gutzmann |
| 9,715,820 B1 | 7/2017 | Boss et al. |
| 9,729,416 B1 | 8/2017 | Khanal et al. |
| 9,756,061 B1 | 9/2017 | Roeh et al. |
| 9,813,311 B1 | 11/2017 | Leone |
| 9,860,209 B2 | 1/2018 | Buchanan et al. |
| 9,876,810 B2 | 1/2018 | Mcdougal et al. |
| 9,888,021 B2 | 2/2018 | Horesh et al. |
| 9,893,897 B2 | 2/2018 | Li et al. |
| 9,967,292 B1 | 5/2018 | Higgins et al. |
| 10,009,364 B2 | 6/2018 | Dasgupta et al. |
| 10,009,793 B2 | 6/2018 | Wetterwald et al. |
| 10,027,689 B1 | 7/2018 | Rathor et al. |
| 10,028,167 B2 | 7/2018 | Calin et al. |
| 10,033,766 B2 | 7/2018 | Gupta et al. |
| 10,037,546 B1 | 7/2018 | Benisch et al. |
| 10,038,611 B1 | 7/2018 | Wu et al. |
| 10,050,982 B1 | 8/2018 | Guerra et al. |
| 10,063,434 B1 | 8/2018 | Khanal et al. |
| 10,116,679 B1 | 10/2018 | Wu et al. |
| 10,122,748 B1 | 11/2018 | Currie |
| 10,176,323 B2 | 1/2019 | Zhang et al. |
| 10,198,667 B2 | 2/2019 | Ryan, Jr. et al. |
| 10,204,211 B2 | 2/2019 | Hammerle et al. |
| 10,237,294 B2 | 3/2019 | Zadeh et al. |
| 10,243,978 B2 | 3/2019 | Roeh et al. |
| 10,263,863 B2 | 4/2019 | Mukerji et al. |
| 10,263,883 B2 | 4/2019 | Kamble |
| 10,264,003 B1 | 4/2019 | Wu et al. |
| 10,270,794 B1 | 4/2019 | Mukerji et al. |
| 10,277,618 B1 | 4/2019 | Wu et al. |
| 10,291,637 B1 | 5/2019 | Bardenstein |
| 10,305,928 B2 | 5/2019 | Mcgrew et al. |
| 10,320,749 B2 | 6/2019 | Sengupta et al. |
| 10,321,344 B2 | 6/2019 | Barton et al. |
| 10,326,676 B1 | 6/2019 | Driggs et al. |
| 10,326,741 B2 | 6/2019 | Rothstein et al. |
| 10,332,005 B1 | 6/2019 | Liao et al. |
| 10,341,206 B1 | 7/2019 | Hammerle et al. |
| 10,348,767 B1 | 7/2019 | Lee et al. |
| 10,375,155 B1 | 8/2019 | Cai et al. |
| 10,380,498 B1 | 8/2019 | Chaoji et al. |
| 10,382,296 B2 | 8/2019 | Khanal et al. |
| 10,382,303 B2 | 8/2019 | Khanal et al. |
| 10,382,401 B1 | 8/2019 | Lee et al. |
| 10,389,574 B1 | 8/2019 | Wu et al. |
| 10,389,611 B2 | 8/2019 | Szabo et al. |
| 10,411,978 B1 | 9/2019 | Ball et al. |
| 10,411,982 B1 | 9/2019 | Driggs et al. |
| 10,412,080 B1 | 9/2019 | Edwards et al. |
| 10,419,454 B2 | 9/2019 | El-Moussa et al. |
| 10,476,673 B2 | 11/2019 | Higgins et al. |
| 10,484,334 B1 | 11/2019 | Lee et al. |
| 10,511,499 B2 | 12/2019 | Mukerji et al. |
| 10,536,268 B2 | 1/2020 | Anderson et al. |
| 10,536,475 B1 | 1/2020 | Mccorkle, Jr. et al. |
| 10,554,665 B1 | 2/2020 | Badawy et al. |
| 10,581,915 B2 | 3/2020 | Scherman et al. |
| 10,587,638 B2 | 3/2020 | Mukerji et al. |
| 10,594,664 B2 | 3/2020 | Zaifman et al. |
| 10,594,709 B2 | 3/2020 | Wu et al. |
| 10,594,718 B1 | 3/2020 | Deaguero et al. |
| 10,616,084 B2 | 4/2020 | Hammerle et al. |
| 10,673,870 B2 | 6/2020 | Pierce |
| 10,728,126 B2 | 7/2020 | Wu et al. |
| 10,742,530 B1 | 8/2020 | Wu et al. |
| 10,742,677 B1 | 8/2020 | Wu et al. |
| 10,778,700 B2 | 9/2020 | Azvine et al. |
| 10,783,262 B2 | 9/2020 | Goyal et al. |
| 10,805,338 B2 | 10/2020 | Kohout et al. |
| 10,841,194 B2 | 11/2020 | Kim et al. |
| 10,944,769 B2 | 3/2021 | Singh |
| 10,965,546 B2 | 3/2021 | Pignataro et al. |
| 10,965,702 B2 | 3/2021 | Higgins et al. |
| 10,979,282 B2 | 4/2021 | Wu et al. |
| 10,979,446 B1 | 4/2021 | Stevens et al. |
| 10,984,122 B2 | 4/2021 | Thomas |
| 10,992,693 B2 | 4/2021 | Luo et al. |
| 11,012,329 B2 | 5/2021 | Ball et al. |
| 11,055,300 B2 | 7/2021 | Zhang et al. |
| 11,057,420 B2 | 7/2021 | Mcgrew et al. |
| 11,093,518 B1 | 8/2021 | Lu et al. |
| 11,106,442 B1 | 8/2021 | Hsiao et al. |
| 11,157,446 B1 | 10/2021 | Kuruvada et al. |
| 11,159,549 B2 | 10/2021 | El-Moussa et al. |
| 11,165,814 B2 | 11/2021 | Lee et al. |
| 11,165,823 B2 | 11/2021 | Wu et al. |
| 11,165,831 B2 | 11/2021 | Higgins et al. |
| 11,188,550 B2 | 11/2021 | Haggie et al. |
| 11,194,901 B2 | 12/2021 | El-Moussa et al. |
| 11,200,246 B2 | 12/2021 | Kharisma et al. |
| 11,201,876 B2 | 12/2021 | Kallos et al. |
| 11,296,967 B1 | 4/2022 | Rothstein et al. |
| 11,310,256 B2 | 4/2022 | Higgins et al. |
| 11,323,467 B2 | 5/2022 | Deaguero et al. |
| 11,349,861 B1 | 5/2022 | Costlow et al. |
| 11,388,072 B2 | 7/2022 | Wu et al. |
| 11,431,744 B2 | 8/2022 | Mukerji et al. |
| 11,438,247 B2 | 9/2022 | Wu et al. |
| 11,463,299 B2 | 10/2022 | Wu et al. |
| 11,463,465 B2 | 10/2022 | Wu et al. |
| 11,463,466 B2 | 10/2022 | Higgins et al. |
| 11,496,378 B2 | 11/2022 | Ball et al. |
| 11,546,153 B2 | 1/2023 | Higgins et al. |
| 11,558,413 B2 | 1/2023 | Higgins et al. |
| 11,652,714 B2 | 5/2023 | Wu et al. |
| 11,665,207 B2 | 5/2023 | Higgins et al. |
| 11,706,233 B2 | 7/2023 | Higgins et al. |
| 11,843,606 B2 | 12/2023 | Wu et al. |
| 11,916,771 B2 | 2/2024 | Rothstein et al. |
| 12,107,888 B2 | 10/2024 | Wu et al. |
| 2001/0054157 A1 | 12/2001 | Fukumoto |
| 2002/0023080 A1 | 2/2002 | Uga et al. |
| 2002/0024964 A1 | 2/2002 | Baum et al. |
| 2002/0035604 A1 | 3/2002 | Cohen et al. |

(56) References Cited

U.S. PATENT DOCUMENTS

| | | |
|---|---|---|
| 2002/0055998 A1 | 5/2002 | Riddle et al. |
| 2002/0065912 A1 | 5/2002 | Catchpole et al. |
| 2002/0078382 A1 | 6/2002 | Sheikh et al. |
| 2002/0080720 A1 | 6/2002 | Pegrum et al. |
| 2002/0091844 A1 | 7/2002 | Craft et al. |
| 2002/0097724 A1 | 7/2002 | Halme et al. |
| 2002/0107953 A1 | 8/2002 | Ontiveros et al. |
| 2002/0133586 A1 | 9/2002 | Shanklin et al. |
| 2002/0133622 A1 | 9/2002 | Pinto |
| 2002/0152209 A1 | 10/2002 | Merugu et al. |
| 2002/0156880 A1 | 10/2002 | Mokuya |
| 2002/0175934 A1 | 11/2002 | Hand et al. |
| 2002/0178360 A1 | 11/2002 | Wenocur et al. |
| 2002/0184362 A1 | 12/2002 | Banerjee et al. |
| 2002/0194483 A1 | 12/2002 | Wenocur et al. |
| 2002/0194501 A1 | 12/2002 | Wenocur et al. |
| 2002/0199096 A1 | 12/2002 | Wenocur et al. |
| 2002/0199098 A1 | 12/2002 | Davis |
| 2003/0014628 A1 | 1/2003 | Freed et al. |
| 2003/0018891 A1 | 1/2003 | Hall et al. |
| 2003/0023733 A1 | 1/2003 | Lingafelt et al. |
| 2003/0084279 A1 | 5/2003 | Campagna |
| 2003/0093514 A1 | 5/2003 | Valdes et al. |
| 2003/0131116 A1 | 7/2003 | Jain et al. |
| 2003/0133443 A1 | 7/2003 | Klinker et al. |
| 2003/0135667 A1 | 7/2003 | Mann et al. |
| 2003/0145225 A1 | 7/2003 | Bruton, III et al. |
| 2003/0149887 A1 | 8/2003 | Yadav |
| 2003/0152094 A1 | 8/2003 | Colavito et al. |
| 2003/0156715 A1 | 8/2003 | Reeds et al. |
| 2003/0188189 A1 | 10/2003 | Desai et al. |
| 2003/0204621 A1 | 10/2003 | Poletto et al. |
| 2003/0212900 A1 | 11/2003 | Liu et al. |
| 2003/0214913 A1 | 11/2003 | Kan et al. |
| 2003/0217144 A1 | 11/2003 | Fu et al. |
| 2003/0233361 A1 | 12/2003 | Cady |
| 2004/0003094 A1 | 1/2004 | See |
| 2004/0010714 A1 | 1/2004 | Stewart |
| 2004/0010718 A1 | 1/2004 | Porras et al. |
| 2004/0047325 A1 | 3/2004 | Hameleers et al. |
| 2004/0049699 A1 | 3/2004 | Griffith et al. |
| 2004/0073512 A1 | 4/2004 | Maung |
| 2004/0088544 A1 | 5/2004 | Tariq et al. |
| 2004/0088557 A1 | 5/2004 | Malcolm et al. |
| 2004/0093414 A1 | 5/2004 | Orton |
| 2004/0093513 A1 | 5/2004 | Cantrell et al. |
| 2004/0146006 A1 | 7/2004 | Jackson |
| 2004/0162070 A1 | 8/2004 | Baral et al. |
| 2004/0199630 A1 | 10/2004 | Sarkissian et al. |
| 2004/0250059 A1 | 12/2004 | Ramelson et al. |
| 2005/0015455 A1 | 1/2005 | Liu |
| 2005/0015622 A1 | 1/2005 | Williams et al. |
| 2005/0044406 A1 | 2/2005 | Stute |
| 2005/0050316 A1 | 3/2005 | Peles |
| 2005/0055578 A1 | 3/2005 | Wright et al. |
| 2005/0060427 A1 | 3/2005 | Phillips et al. |
| 2005/0066196 A1 | 3/2005 | Yagi |
| 2005/0086255 A1 | 4/2005 | Schran et al. |
| 2005/0091341 A1 | 4/2005 | Knight et al. |
| 2005/0091357 A1 | 4/2005 | Krantz et al. |
| 2005/0100000 A1 | 5/2005 | Faulkner et al. |
| 2005/0111367 A1 | 5/2005 | Jonathan Chao et al. |
| 2005/0125553 A1 | 6/2005 | Wu et al. |
| 2005/0125684 A1 | 6/2005 | Schmidt |
| 2005/0182833 A1 | 8/2005 | Duffie, III et al. |
| 2005/0193245 A1 | 9/2005 | Hayden et al. |
| 2005/0201363 A1 | 9/2005 | Gilchrist et al. |
| 2005/0207413 A1 | 9/2005 | Lerner |
| 2005/0210242 A1 | 9/2005 | Troxel et al. |
| 2005/0234920 A1 | 10/2005 | Rhodes |
| 2005/0251009 A1 | 11/2005 | Morita et al. |
| 2005/0262237 A1 | 11/2005 | Fulton et al. |
| 2005/0270975 A1 | 12/2005 | Meylan et al. |
| 2005/0271072 A1 | 12/2005 | Anderson et al. |
| 2006/0029096 A1 | 2/2006 | Babbar et al. |
| 2006/0045016 A1 | 3/2006 | Dawdy et al. |
| 2006/0045017 A1 | 3/2006 | Yamasaki |
| 2006/0075358 A1 | 4/2006 | Ahokas |
| 2006/0085379 A1 | 4/2006 | Heidloff et al. |
| 2006/0085526 A1 | 4/2006 | Gulland |
| 2006/0101068 A1 | 5/2006 | Stuhec et al. |
| 2006/0106743 A1 | 5/2006 | Horvitz |
| 2006/0114832 A1 | 6/2006 | Hamilton et al. |
| 2006/0123477 A1 | 6/2006 | Raghavan et al. |
| 2006/0171333 A1 | 8/2006 | Shimada et al. |
| 2006/0174343 A1 | 8/2006 | Duthie et al. |
| 2006/0184535 A1 | 8/2006 | Kaluskar et al. |
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1 | 9/2006 | Schcolnik |
| 2006/0230452 A1 | 10/2006 | Field |
| 2006/0230456 A1 | 10/2006 | Nagabhushan et al. |
| 2006/0233349 A1 | 10/2006 | Cooper |
| 2006/0248407 A1 | 11/2006 | Adams, Jr. et al. |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1 | 9/2007 | Liu et al. |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2007/0271592 A1 | 11/2007 | Noda et al. |
| 2008/0019275 A1 | 1/2008 | Mudireddy et al. |
| 2008/0022401 A1 | 1/2008 | Cameron et al. |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1 | 7/2008 | Kapoor et al. |
| 2008/0172416 A1 | 7/2008 | Ito |
| 2008/0174343 A1 | 7/2008 | Cha et al. |
| 2008/0209045 A1 | 8/2008 | Rothstein et al. |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1 | 9/2008 | Martin et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0141634 A1 | 6/2009 | Rothstein et al. |
| 2009/0168657 A1 | 7/2009 | Puri et al. |
| 2009/0187653 A1 | 7/2009 | Fu et al. |
| 2009/0204723 A1 | 8/2009 | Tonsing et al. |

(56) References Cited

U.S. PATENT DOCUMENTS

| | | |
|---|---|---|
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0265344 A1 | 10/2009 | Etoh et al. |
| 2009/0268605 A1 | 10/2009 | Campbell et al. |
| 2009/0271469 A1 | 10/2009 | Benco et al. |
| 2009/0271511 A1 | 10/2009 | Peracha |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0088670 A1 | 4/2010 | Paster |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1 | 6/2010 | Long et al. |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0235481 A1 | 9/2010 | Deutsch et al. |
| 2010/0250918 A1 | 9/2010 | Tremblay et al. |
| 2010/0250928 A1 | 9/2010 | Goto |
| 2010/0268937 A1 | 10/2010 | Blom et al. |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0073490 A1 | 3/2011 | Hayamizu et al. |
| 2011/0098973 A1 | 4/2011 | Seidman |
| 2011/0122792 A1 | 5/2011 | Duffield et al. |
| 2011/0126259 A1 | 5/2011 | Krishnamurthi et al. |
| 2011/0126275 A1 | 5/2011 | Anderson et al. |
| 2011/0141913 A1 | 6/2011 | Clemens et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0231935 A1 | 9/2011 | Gula et al. |
| 2011/0280149 A1 | 11/2011 | Okada et al. |
| 2011/0296002 A1 | 12/2011 | Caram |
| 2011/0320394 A1 | 12/2011 | Mckeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Toensing et al. |
| 2012/0159267 A1 | 6/2012 | Gyorffy |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233311 A1 | 9/2012 | Parker et al. |
| 2012/0233694 A1 | 9/2012 | Baliga et al. |
| 2012/0243533 A1 | 9/2012 | Leong |
| 2012/0266209 A1 | 10/2012 | Gooding et al. |
| 2012/0278477 A1 | 11/2012 | Terrell et al. |
| 2012/0278625 A1 | 11/2012 | Narayanan et al. |
| 2012/0278890 A1 | 11/2012 | Maeaettae et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0041896 A1 | 2/2013 | Ghani et al. |
| 2013/0042323 A1 | 2/2013 | Narayanaswamy et al. |
| 2013/0054758 A1 | 2/2013 | Imes et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0111543 A1 | 5/2013 | Brown et al. |
| 2013/0133032 A1 | 5/2013 | Li et al. |
| 2013/0136011 A1 | 5/2013 | Tardo et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1 | 8/2013 | Rubin et al. |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0227689 A1 | 8/2013 | Pietrowicz et al. |
| 2013/0232104 A1 | 9/2013 | Goyal et al. |
| 2013/0262655 A1 | 10/2013 | Deschenes et al. |
| 2013/0283373 A1 | 10/2013 | Zisapel et al. |
| 2013/0291107 A1 | 10/2013 | Marck et al. |
| 2013/0305357 A1 | 11/2013 | Ayyagari et al. |
| 2013/0305392 A1 | 11/2013 | Bar-El et al. |
| 2013/0315260 A1 | 11/2013 | Adiraju et al. |
| 2013/0339514 A1 | 12/2013 | Crank et al. |
| 2013/0347018 A1 | 12/2013 | Limp et al. |
| 2014/0007222 A1 | 1/2014 | Qureshi et al. |
| 2014/0013434 A1 | 1/2014 | Ranum et al. |
| 2014/0020067 A1 | 1/2014 | Kim et al. |
| 2014/0026193 A1 | 1/2014 | Saxman et al. |
| 2014/0040451 A1 | 2/2014 | Agrawal et al. |
| 2014/0068035 A1 | 3/2014 | Croy et al. |
| 2014/0075536 A1 | 3/2014 | Davis et al. |
| 2014/0077956 A1 | 3/2014 | Sampath et al. |
| 2014/0109168 A1 | 4/2014 | Ashley et al. |
| 2014/0149456 A1 | 5/2014 | Carr et al. |
| 2014/0164584 A1 | 6/2014 | Joe et al. |
| 2014/0165207 A1 | 6/2014 | Engel et al. |
| 2014/0177497 A1 | 6/2014 | Backholm et al. |
| 2014/0181248 A1 | 6/2014 | Deutsch et al. |
| 2014/0189093 A1 | 7/2014 | Du Toit et al. |
| 2014/0195666 A1 | 7/2014 | Dumitriu et al. |
| 2014/0195797 A1 | 7/2014 | Du Toit |
| 2014/0201838 A1 | 7/2014 | Varsanyi et al. |
| 2014/0222998 A1 | 8/2014 | Vasseur et al. |
| 2014/0223325 A1 | 8/2014 | Melendez et al. |
| 2014/0241164 A1 | 8/2014 | Cociglio et al. |
| 2014/0242972 A1 | 8/2014 | Slotznick |
| 2014/0244851 A1 | 8/2014 | Lee |
| 2014/0245423 A1 | 8/2014 | Lee |
| 2014/0258511 A1 | 9/2014 | Sima et al. |
| 2014/0269276 A1 | 9/2014 | Rothstein et al. |
| 2014/0269777 A1 | 9/2014 | Rothstein et al. |
| 2014/0280907 A1 | 9/2014 | Rothstein et al. |
| 2014/0280908 A1 | 9/2014 | Rothstein et al. |
| 2014/0304211 A1 | 10/2014 | Horvitz |
| 2014/0304339 A1 | 10/2014 | Hamilton |
| 2014/0310392 A1 | 10/2014 | Ho |
| 2014/0317288 A1 | 10/2014 | Krueger et al. |
| 2014/0337500 A1 | 11/2014 | Lee |
| 2014/0344633 A1 | 11/2014 | Li et al. |
| 2014/0351415 A1 | 11/2014 | Harrigan et al. |
| 2015/0006896 A1 | 1/2015 | Franck |
| 2015/0007314 A1 | 1/2015 | Vaughan |
| 2015/0007316 A1 | 1/2015 | Ben-shalom et al. |
| 2015/0019867 A1 | 1/2015 | Rothstein et al. |
| 2015/0019991 A1 | 1/2015 | Kristjánsson |
| 2015/0023168 A1 | 1/2015 | Kotecha et al. |
| 2015/0026027 A1 | 1/2015 | Priess et al. |
| 2015/0036501 A1 | 2/2015 | Rothstein et al. |
| 2015/0039749 A1 | 2/2015 | Kwan et al. |
| 2015/0058987 A1 | 2/2015 | Thure et al. |
| 2015/0063158 A1 | 3/2015 | Nedeltchev et al. |

(56) References Cited

U.S. PATENT DOCUMENTS

| | | |
|---|---|---|
| 2015/0074258 A1 | 3/2015 | Ferreira et al. |
| 2015/0074462 A1 | 3/2015 | Jacoby |
| 2015/0089034 A1 | 3/2015 | Stickle et al. |
| 2015/0096022 A1 | 4/2015 | Vincent et al. |
| 2015/0097683 A1 | 4/2015 | Sloo et al. |
| 2015/0100780 A1 | 4/2015 | Rubin et al. |
| 2015/0106616 A1 | 4/2015 | Nix |
| 2015/0106930 A1 | 4/2015 | Honda et al. |
| 2015/0113588 A1 | 4/2015 | Wing et al. |
| 2015/0121461 A1 | 4/2015 | Dulkin et al. |
| 2015/0134554 A1 | 5/2015 | Clais et al. |
| 2015/0134776 A1 | 5/2015 | Kruglick |
| 2015/0149828 A1 | 5/2015 | Mukerji et al. |
| 2015/0180759 A1 | 6/2015 | Fallon |
| 2015/0180890 A1 | 6/2015 | Ronen et al. |
| 2015/0188702 A1 | 7/2015 | Men et al. |
| 2015/0199229 A1 | 7/2015 | Amendjian et al. |
| 2015/0199613 A1 | 7/2015 | Ruiz et al. |
| 2015/0227859 A1 | 8/2015 | Ames, II |
| 2015/0229661 A1 | 8/2015 | Balabine et al. |
| 2015/0242627 A1 | 8/2015 | Lee et al. |
| 2015/0249512 A1 | 9/2015 | Adimatyam et al. |
| 2015/0254439 A1 | 9/2015 | Ao et al. |
| 2015/0269358 A1 | 9/2015 | Hesketh et al. |
| 2015/0277802 A1 | 10/2015 | Oikarinen et al. |
| 2015/0304350 A1 | 10/2015 | Lin et al. |
| 2015/0331771 A1 | 11/2015 | Conway |
| 2015/0341379 A1 | 11/2015 | Lefebvre et al. |
| 2015/0350167 A1 | 12/2015 | Djakovic |
| 2015/0365438 A1 | 12/2015 | Carver et al. |
| 2016/0006766 A1 | 1/2016 | Joo |
| 2016/0007314 A1 | 1/2016 | Rezvani et al. |
| 2016/0026922 A1 | 1/2016 | Vasseur et al. |
| 2016/0028755 A1 | 1/2016 | Vasseur et al. |
| 2016/0036647 A1 | 2/2016 | Gonzalez et al. |
| 2016/0043919 A1 | 2/2016 | Connelly et al. |
| 2016/0055335 A1 | 2/2016 | Herwono et al. |
| 2016/0056959 A1 | 2/2016 | Blom et al. |
| 2016/0080236 A1 | 3/2016 | Nikolaev et al. |
| 2016/0093205 A1 | 3/2016 | Boyer |
| 2016/0105471 A1 | 4/2016 | Nunes et al. |
| 2016/0112475 A1 | 4/2016 | Lawson et al. |
| 2016/0112521 A1 | 4/2016 | Lawson et al. |
| 2016/0119215 A1 | 4/2016 | Deschenes et al. |
| 2016/0127401 A1 | 5/2016 | Chauhan et al. |
| 2016/0134659 A1 | 5/2016 | Reddy et al. |
| 2016/0142435 A1 | 5/2016 | Bernstein et al. |
| 2016/0147583 A1 | 5/2016 | Ben et al. |
| 2016/0173288 A1 | 6/2016 | Li et al. |
| 2016/0173556 A1 | 6/2016 | Park et al. |
| 2016/0182274 A1 | 6/2016 | Kiesekamp et al. |
| 2016/0197949 A1 | 7/2016 | Nyhuis et al. |
| 2016/0219066 A1 | 7/2016 | Vasseur et al. |
| 2016/0226913 A1 | 8/2016 | Sood et al. |
| 2016/0241574 A1 | 8/2016 | Kumar et al. |
| 2016/0255115 A1 | 9/2016 | Mital et al. |
| 2016/0262044 A1 | 9/2016 | Calin et al. |
| 2016/0285752 A1 | 9/2016 | Joshi |
| 2016/0294870 A1 | 10/2016 | Banerjee et al. |
| 2016/0301624 A1 | 10/2016 | Gonzalez et al. |
| 2016/0301709 A1 | 10/2016 | Hassanzadeh et al. |
| 2016/0308725 A1 | 10/2016 | Tang et al. |
| 2016/0315916 A1 | 10/2016 | Rothstein et al. |
| 2016/0337312 A1 | 11/2016 | Buchanan et al. |
| 2016/0352761 A1 | 12/2016 | Mcgrew et al. |
| 2016/0357964 A1 | 12/2016 | Mulchandani |
| 2016/0357967 A1 | 12/2016 | Mulchandani |
| 2016/0359872 A1 | 12/2016 | Yadav et al. |
| 2016/0359915 A1 | 12/2016 | Gupta et al. |
| 2016/0366020 A1 | 12/2016 | Ramachandran et al. |
| 2016/0366186 A1 | 12/2016 | Kamble |
| 2016/0373414 A1 | 12/2016 | Maccarthaigh |
| 2016/0380851 A1 | 12/2016 | Kosai et al. |
| 2016/0380885 A1 | 12/2016 | Jani et al. |
| 2017/0012836 A1 | 1/2017 | Tongaonkar et al. |
| 2017/0041296 A1 | 2/2017 | Ford et al. |
| 2017/0048109 A1 | 2/2017 | Kant et al. |
| 2017/0070416 A1 | 3/2017 | Narayanan et al. |
| 2017/0076206 A1 | 3/2017 | Lastras-Montano et al. |
| 2017/0085445 A1 | 3/2017 | Layman et al. |
| 2017/0085459 A1 | 3/2017 | Xia et al. |
| 2017/0085590 A1 | 3/2017 | Hsu et al. |
| 2017/0090906 A1 | 3/2017 | Reynolds |
| 2017/0093796 A1 | 3/2017 | Wang et al. |
| 2017/0093891 A1 | 3/2017 | Mitchell |
| 2017/0093897 A1 | 3/2017 | Cochin et al. |
| 2017/0097982 A1 | 4/2017 | Zhang et al. |
| 2017/0099196 A1 | 4/2017 | Barsheshet et al. |
| 2017/0111272 A1 | 4/2017 | Liu et al. |
| 2017/0118092 A1 | 4/2017 | Dixon et al. |
| 2017/0123886 A1 | 5/2017 | Vaideeswaran |
| 2017/0126472 A1 | 5/2017 | Margalit et al. |
| 2017/0126709 A1 | 5/2017 | Baradaran et al. |
| 2017/0134937 A1 | 5/2017 | Miller et al. |
| 2017/0195353 A1 | 7/2017 | Taylor et al. |
| 2017/0201810 A1 | 7/2017 | Anderson et al. |
| 2017/0220739 A1 | 8/2017 | Hammerle et al. |
| 2017/0228253 A1 | 8/2017 | Layman et al. |
| 2017/0230270 A1 | 8/2017 | Padinhakara et al. |
| 2017/0230417 A1 | 8/2017 | Amar et al. |
| 2017/0270105 A1 | 9/2017 | Ninan et al. |
| 2017/0279837 A1 | 9/2017 | Dasgupta et al. |
| 2017/0279838 A1 | 9/2017 | Dasgupta et al. |
| 2017/0279839 A1 | 9/2017 | Vasseur et al. |
| 2017/0288974 A1 | 10/2017 | Yoshihira et al. |
| 2017/0288987 A1 | 10/2017 | Pasupathy et al. |
| 2017/0289104 A1 | 10/2017 | Shankar et al. |
| 2017/0289168 A1 | 10/2017 | Bar et al. |
| 2017/0289185 A1 | 10/2017 | Mandyam |
| 2017/0289847 A1 | 10/2017 | Wetterwald et al. |
| 2017/0310703 A1 | 10/2017 | Ackerman et al. |
| 2017/0317941 A1 | 11/2017 | Eggleston et al. |
| 2017/0324758 A1 | 11/2017 | Hart et al. |
| 2017/0353437 A1 | 12/2017 | Ayyadevara et al. |
| 2017/0353477 A1 | 12/2017 | Faigon et al. |
| 2017/0364794 A1 | 12/2017 | Mahkonen et al. |
| 2017/0366526 A1 | 12/2017 | Wood et al. |
| 2018/0004972 A1 | 1/2018 | Ruggiero et al. |
| 2018/0007087 A1 | 1/2018 | Grady et al. |
| 2018/0013650 A1 | 1/2018 | Khanal et al. |
| 2018/0033089 A1 | 2/2018 | Goldman et al. |
| 2018/0034783 A1 | 2/2018 | Rothstein et al. |
| 2018/0075240 A1 | 3/2018 | Chen |
| 2018/0077189 A1 | 3/2018 | Doppke et al. |
| 2018/0084011 A1 | 3/2018 | Joseph et al. |
| 2018/0089286 A1 | 3/2018 | Marquardt et al. |
| 2018/0091391 A1 | 3/2018 | Turow et al. |
| 2018/0091413 A1 | 3/2018 | Richards et al. |
| 2018/0091534 A1 | 3/2018 | Dubrovsky et al. |
| 2018/0103056 A1 | 4/2018 | Kohout et al. |
| 2018/0109507 A1 | 4/2018 | Caldera et al. |
| 2018/0109557 A1 | 4/2018 | Yoo et al. |
| 2018/0115566 A1 | 4/2018 | Azvine et al. |
| 2018/0124078 A1 | 5/2018 | Hajmasan et al. |
| 2018/0131675 A1 | 5/2018 | Sengupta et al. |
| 2018/0131711 A1 | 5/2018 | Chen et al. |
| 2018/0137001 A1 | 5/2018 | Zong et al. |
| 2018/0139227 A1 | 5/2018 | Martin et al. |
| 2018/0145995 A1 | 5/2018 | Roeh et al. |
| 2018/0167310 A1 | 6/2018 | Kamble |
| 2018/0191755 A1 | 7/2018 | Monaco et al. |
| 2018/0198812 A1 | 7/2018 | Christodorescu et al. |
| 2018/0219879 A1 | 8/2018 | Pierce |
| 2018/0260715 A1 | 9/2018 | Yan et al. |
| 2018/0262487 A1 | 9/2018 | Zaifman et al. |
| 2018/0276561 A1 | 9/2018 | Pasternack et al. |
| 2018/0278419 A1 | 9/2018 | Higgins et al. |
| 2018/0324061 A1 | 11/2018 | Khanal et al. |
| 2018/0351781 A1 | 12/2018 | Movsisyan et al. |
| 2018/0351970 A1 | 12/2018 | Majumder et al. |
| 2018/0375882 A1 | 12/2018 | Kallos et al. |
| 2018/0375893 A1 | 12/2018 | Jordan et al. |
| 2019/0005205 A1 | 1/2019 | Dargar et al. |
| 2019/0007283 A1 | 1/2019 | Kieviet et al. |

(56) References Cited

U.S. PATENT DOCUMENTS

| | | |
|---|---|---|
| 2019/0012441 A1 | 1/2019 | Tuli et al. |
| 2019/0020669 A1 | 1/2019 | Glatfelter et al. |
| 2019/0028357 A1 | 1/2019 | Kokkula et al. |
| 2019/0052554 A1 | 2/2019 | Mukerji et al. |
| 2019/0052675 A1 | 2/2019 | Krebs |
| 2019/0068465 A1 | 2/2019 | Khanal et al. |
| 2019/0079979 A1 | 3/2019 | Chan |
| 2019/0095478 A1 | 3/2019 | Tankersley et al. |
| 2019/0102469 A1 | 4/2019 | Makovsky et al. |
| 2019/0121979 A1 | 4/2019 | Chari et al. |
| 2019/0124123 A1 | 4/2019 | Higgins et al. |
| 2019/0132358 A1 | 5/2019 | Divalentin et al. |
| 2019/0132359 A1 | 5/2019 | Kraenzel et al. |
| 2019/0163678 A1 | 5/2019 | Bath et al. |
| 2019/0171725 A1 | 6/2019 | Shen et al. |
| 2019/0196912 A1 | 6/2019 | Didehban et al. |
| 2019/0199609 A1 | 6/2019 | Hammerle et al. |
| 2019/0230095 A1 | 7/2019 | Mcgrew et al. |
| 2019/0230124 A1* | 7/2019 | Hodgman ............ H04L 67/1036 |
| 2019/0236149 A1 | 8/2019 | Kuruvada et al. |
| 2019/0245734 A1 | 8/2019 | Wu et al. |
| 2019/0245759 A1 | 8/2019 | Mukerji et al. |
| 2019/0245763 A1 | 8/2019 | Wu et al. |
| 2019/0245873 A1 | 8/2019 | Wu et al. |
| 2019/0253445 A1 | 8/2019 | Mukerji et al. |
| 2019/0260764 A1 | 8/2019 | Humphrey et al. |
| 2019/0266999 A1 | 8/2019 | Chandrasekaran et al. |
| 2019/0303198 A1 | 10/2019 | Kim et al. |
| 2019/0318109 A1 | 10/2019 | Thomas |
| 2019/0327156 A1 | 10/2019 | Hammerle et al. |
| 2019/0340554 A1 | 11/2019 | Dotan-cohen et al. |
| 2019/0372827 A1 | 12/2019 | Vasseur et al. |
| 2019/0372828 A1 | 12/2019 | Wu et al. |
| 2019/0372864 A1 | 12/2019 | Pignataro et al. |
| 2019/0387005 A1 | 12/2019 | Zawoad et al. |
| 2020/0034528 A1 | 1/2020 | Yang et al. |
| 2020/0052985 A1 | 2/2020 | Ball et al. |
| 2020/0067952 A1 | 2/2020 | Deaguero et al. |
| 2020/0076597 A1 | 3/2020 | Higgins et al. |
| 2020/0082081 A1 | 3/2020 | Sarin et al. |
| 2020/0099703 A1 | 3/2020 | Singh |
| 2020/0167349 A1 | 5/2020 | Marquardt et al. |
| 2020/0201850 A1 | 6/2020 | Haggie et al. |
| 2020/0220849 A1 | 7/2020 | Zaifman et al. |
| 2020/0236131 A1 | 7/2020 | Vejman et al. |
| 2020/0287885 A1 | 9/2020 | Rodniansky |
| 2020/0287927 A1 | 9/2020 | Zadeh et al. |
| 2020/0321087 A1 | 10/2020 | Willis et al. |
| 2020/0366691 A1 | 11/2020 | Pierce |
| 2020/0382529 A1 | 12/2020 | Higgins et al. |
| 2020/0389469 A1 | 12/2020 | Litichever et al. |
| 2021/0006589 A1 | 1/2021 | Kohout et al. |
| 2021/0012020 A1 | 1/2021 | Malton et al. |
| 2021/0037033 A1 | 2/2021 | Mukerji et al. |
| 2021/0037043 A1 | 2/2021 | Lee et al. |
| 2021/0044608 A1 | 2/2021 | Deaguero et al. |
| 2021/0160283 A1* | 5/2021 | St. Pierre ............ H04L 63/1491 |
| 2021/0185087 A1 | 6/2021 | Wu et al. |
| 2021/0194781 A1 | 6/2021 | Wu et al. |
| 2021/0194908 A1 | 6/2021 | Wu et al. |
| 2021/0211466 A1 | 7/2021 | Sellers |
| 2021/0218714 A1 | 7/2021 | Wang et al. |
| 2021/0250368 A1 | 8/2021 | Hearty et al. |
| 2021/0288895 A1 | 9/2021 | Wu et al. |
| 2021/0288993 A1 | 9/2021 | Kraning et al. |
| 2021/0342337 A1 | 11/2021 | Lu et al. |
| 2021/0350276 A1 | 11/2021 | Ashlock et al. |
| 2021/0360004 A1 | 11/2021 | Mcgrew et al. |
| 2021/0360011 A1 | 11/2021 | O'Hara et al. |
| 2022/0019688 A1 | 1/2022 | Nelluri et al. |
| 2022/0021694 A1 | 1/2022 | Higgins et al. |
| 2022/0029875 A1 | 1/2022 | Wu et al. |
| 2022/0053022 A1 | 2/2022 | Wu et al. |
| 2022/0060503 A1 | 2/2022 | Lee et al. |
| 2022/0060518 A1 | 2/2022 | Higgins et al. |
| 2022/0067177 A1 | 3/2022 | Chugunov |
| 2022/0070073 A1 | 3/2022 | Ball et al. |
| 2022/0070188 A1 | 3/2022 | Sheedy et al. |
| 2022/0094706 A1 | 3/2022 | Higgins et al. |
| 2022/0224716 A1 | 7/2022 | Salji |
| 2022/0239685 A1 | 7/2022 | Higgins et al. |
| 2022/0247771 A1 | 8/2022 | Higgins et al. |
| 2022/0345384 A1 | 10/2022 | Wu et al. |
| 2022/0407881 A1 | 12/2022 | Costlow et al. |
| 2023/0087451 A1 | 3/2023 | Rothstein et al. |
| 2023/0319047 A1 | 10/2023 | Wu et al. |

FOREIGN PATENT DOCUMENTS

| | | |
|---|---|---|
| AU | 2008328833 A1 | 6/2009 |
| CN | 105071987 A | 11/2015 |
| CN | 105323247 A | 2/2016 |
| CN | 106170008 A | 11/2016 |
| CN | 106341375 A | 1/2017 |
| CN | 107646190 A | 1/2018 |
| CN | 107667510 A | 2/2018 |
| CN | 106533665 B | 8/2018 |
| CN | 109104441 A | 12/2018 |
| CN | 109542772 A | 3/2019 |
| CN | 110113349 A | 8/2019 |
| CN | 107667510 B | 11/2020 |
| CN | 112085039 A | 12/2020 |
| CN | 112398876 A | 2/2021 |
| CN | 107646190 B | 3/2021 |
| DE | 69533953 | 3/2005 |
| DE | 69533953 T2 | 4/2006 |
| EP | 0702477 A2 | 3/1996 |
| EP | 0702477 A3 | 7/1999 |
| EP | 1026867 A2 | 8/2000 |
| EP | 1579629 A2 | 5/2004 |
| EP | 0702477 B1 | 1/2005 |
| EP | 2057576 A2 | 3/2008 |
| EP | 1579629 A4 | 11/2009 |
| EP | 2215801 B1 | 4/2011 |
| EP | 2057576 A4 | 4/2012 |
| EP | 3089424 A1 | 11/2016 |
| EP | 3094061 A1 | 11/2016 |
| EP | 3113443 A1 | 1/2017 |
| EP | 3306890 A1 | 4/2018 |
| EP | 3442164 A1 | 2/2019 |
| EP | 3477904 A1 | 5/2019 |
| EP | 3794800 A1 | 11/2019 |
| EP | 3834376 A1 | 2/2020 |
| EP | 3394784 B1 | 10/2020 |
| EP | 3272095 B1 | 3/2021 |
| EP | 3477904 B1 | 11/2021 |
| EP | 4218212 A1 | 3/2022 |
| EP | 3794800 B1 | 11/2022 |
| EP | 3089424 B1 | 6/2023 |
| EP | 3442164 B1 | 8/2023 |
| EP | 3834376 B1 | 9/2023 |
| FR | 2924552 A1 | 6/2009 |
| GB | 2545910 A | 7/2017 |
| GB | 2545910 B | 2/2018 |
| KR | 96-12819 A | 4/1996 |
| KR | 10-0388606 B1 | 11/2003 |
| KR | 10-2014-0093060 A | 7/2014 |
| KR | 10-1662614 B1 | 10/2016 |
| NZ | 586270 A | 12/2011 |
| WO | 2004/040423 A2 | 5/2004 |
| WO | 2004/040423 A3 | 7/2004 |
| WO | 2008/026212 A2 | 3/2008 |
| WO | 2009/015461 A1 | 2/2009 |
| WO | 2008/026212 A3 | 5/2009 |
| WO | 2009/068603 A2 | 6/2009 |
| WO | 2015/128613 A1 | 9/2015 |
| WO | 2016/118131 A1 | 7/2016 |
| WO | 2016/144932 A1 | 9/2016 |
| WO | 2016/146610 A1 | 9/2016 |
| WO | 2016/191486 A1 | 12/2016 |
| WO | 2017/108575 A1 | 6/2017 |
| WO | 2017/108576 A1 | 6/2017 |
| WO | 2018/204237 A1 | 11/2018 |
| WO | 2019/032137 A1 | 2/2019 |

(56) References Cited

FOREIGN PATENT DOCUMENTS

| WO | 2019/083555 A1 | 5/2019 |
| WO | 2019/221911 A1 | 11/2019 |
| WO | 2020/033005 A1 | 2/2020 |
| WO | 2020/131740 A1 | 6/2020 |
| WO | 2022/066910 A1 | 3/2022 |

OTHER PUBLICATIONS

Office Communication for U.S. Appl. No. 14/518,996 mailed Apr. 20, 2015, 37 Pages.
Office Communication for U.S. Appl. No. 14/695,690 mailed Sep. 9, 2015, 41 Pages.
Office Communication for U.S. Appl. No. 15/014,932 mailed Aug. 1, 2017, 27 Pages.
Office Communication for U.S. Appl. No. 15/014,932 mailed Mar. 3, 2017, 6 Pages.
Office Communication for U.S. Appl. No. 15/219,016 mailed Nov. 22, 2016, 2 Pages.
Office Communication for U.S. Appl. No. 15/443,868 mailed Aug. 11, 2017, 11 Pages.
Office Communication for U.S. Appl. No. 15/457,886 mailed Jan. 5, 2018, 11 Pages.
Office Communication for U.S. Appl. No. 15/585,887 mailed Aug. 28, 2020, 30 Pages.
Office Communication for U.S. Appl. No. 16/384,574 mailed Jan. 13, 2020, 23 Pages.
Office Communication for U.S. Appl. No. 16/384,574 mailed May 31, 2019, 12 Pages.
Office Communication for U.S. Appl. No. 16/384,574 mailed Oct. 8, 2019, 13 Pages.
Office Communication for U.S. Appl. No. 11/683,643 mailed Apr. 28, 2010, 35 Pages.
Office Communication for U.S. Appl. No. 11/683,643 mailed Jan. 23, 2012, 22 Pages.
Office Communication for U.S. Appl. No. 11/683,643 mailed Oct. 14, 2010, 43 Pages.
Office Communication for U.S. Appl. No. 12/326,672 mailed Dec. 23, 2010, 15 Pages.
Office Communication for U.S. Appl. No. 12/326,672 mailed Jun. 22, 2011, 16 Pages.
Office Communication for U.S. Appl. No. 12/326,672 mailed Jun. 9, 2010, 9 Pages.
Office Communication for U.S. Appl. No. 12/326,672 mailed Oct. 24, 2011, 9 Pages.
Office Communication for U.S. Appl. No. 13/831,626 mailed Sep. 3, 2013, 17 Pages.
Office Communication for U.S. Appl. No. 13/831,673 mailed Mar. 6, 2014, 12 Pages.
Office Communication for U.S. Appl. No. 13/831,673 mailed May 22, 2014, 5 Pages.
Office Communication for U.S. Appl. No. 13/831,673 mailed Sep. 30, 2013, 10 Pages.
Office Communication for U.S. Appl. No. 13/831,908 mailed Apr. 9, 2014, 3 Pages.
Office Communication for U.S. Appl. No. 13/831,908 mailed Aug. 9, 2013, 29 Pages.
Office Communication for U.S. Appl. No. 13/831,908 mailed Jun. 25, 2014, 15 Pages.
Office Communication for U.S. Appl. No. 13/831,959 mailed Aug. 22, 2013, 9 Pages.
Office Communication for U.S. Appl. No. 14/107,580 mailed Mar. 17, 2015, 5 Pages.
Office Communication for U.S. Appl. No. 14/107,580 mailed Mar. 6, 2014, 13 Pages.
Office Communication for U.S. Appl. No. 14/107,580 mailed Sep. 15, 2014, 15 Pages.
Office Communication for U.S. Appl. No. 14/107,631 mailed Dec. 30, 2014, 12 Pages.
Office Communication for U.S. Appl. No. 14/107,631 mailed Feb. 20, 2014, pp. 1-16.
Office Communication for U.S. Appl. No. 14/107,631 mailed Sep. 26, 2014, pp. 1-14.
Office Communication for U.S. Appl. No. 14/500,893 mailed Feb. 18, 2015, 11 Pages.
Office Communication for U.S. Appl. No. 14/500,893 mailed Jun. 15, 2015, 12 Pages.
Office Communication for U.S. Appl. No. 14/500,893 mailed Nov. 20, 2014, 15 Pages.
Office Communication for U.S. Appl. No. 14/518,996 mailed Jul. 21, 2015, 17 Pages.
Office Communication for U.S. Appl. No. 14/518,996 mailed Nov. 20, 2014, 41 Pages.
Office Communication for U.S. Appl. No. 14/695,690 mailed Feb. 24, 2016, 32 Pages.
Office Communication for U.S. Appl. No. 14/750,905 mailed Jan. 19, 2016, 5 Pages.
Office Communication for U.S. Appl. No. 14/750,905 mailed Sep. 22, 2015, 12 Pages.
Office Communication for U.S. Appl. No. 15/014,932 mailed May 15, 2018, 23 Pages.
Office Communication for U.S. Appl. No. 15/014,932 mailed Dec. 14, 2016, 26 Pages.
Office Communication for U.S. Appl. No. 15/014,932 mailed Jul. 16, 2018, 4 Pages.
Office Communication for U.S. Appl. No. 15/014,932 mailed Jun. 10, 2016, 20 Pages.
Office Communication for U.S. Appl. No. 15/014,932 mailed Nov. 23, 2018, 10 Pages.
Office Communication for U.S. Appl. No. 15/082,925 mailed Feb. 1, 2017, 6 Pages.
Office Communication for U.S. Appl. No. 15/082,925 mailed Sep. 13, 2016, 7 Pages.
Office Communication for U.S. Appl. No. 15/150,354 mailed Feb. 8, 2017, 18 Pages.
Office Communication for U.S. Appl. No. 15/150,354 mailed Jul. 5, 2016, 18 Pages.
Office Communication for U.S. Appl. No. 15/585,887 mailed May 3, 2024, 45 Pages.
Office Communication for U.S. Appl. No. 17/516,063 mailed Apr. 19, 2024, 4 Pages.
Office Communication for U.S. Appl. No. 15/585,887 mailed Jun. 7, 2024, 4 Pages.
Office Communication for U.S. Appl. No. 17/516,063 mailed Jun. 4, 2024, 13 Pages.
Office Communication for U.S. Appl. No. 17/516,529 mailed Jul. 2, 2024, 12 Pages.
Office Communication for U.S. Appl. No. 17/826,011 mailed Jul. 8, 2024, 12 Pages.
Office Communication for U.S. Appl. No. 15/585,887 mailed Aug. 15, 2024, 45 Pages.
Extended European Search Report for European Patent Application No. 21873430.9 mailed Sep. 16, 2024, 14 Pages.
Pérez Eloy, "Kerberos (I): How does Kerberos work?—Theory", Mar. 20, 2019, BlackArrow, Tarlogic, Available online at <https://www.tarlogic.com/blog/how-kerberos-works/>, 23 pages.
Office Communication for U.S. Appl. No. 17/516,063 mailed Oct. 17, 2024, 13 Pages.
Office Communication for U.S. Appl. No. 16/718,050 mailed Sep. 4, 2020, 23 Pages.
Office Communication for U.S. Appl. No. 16/813,649 mailed Apr. 1, 2022, 4 Pages.
Office Communication for U.S. Appl. No. 16/813,649 mailed Dec. 20, 2021, 44 Pages.
Office Communication for U.S. Appl. No. 16/813,649 mailed Feb. 24, 2021, 7 Pages.
Office Communication for U.S. Appl. No. 16/813,649 mailed May 11, 2022, 16 Pages.
Office Communication for U.S. Appl. No. 16/820,582 mailed Jan. 14, 2022, 13 Pages.
Office Communication for U.S. Appl. No. 16/820,582 mailed May 10, 2021, 24 Pages.

(56) References Cited

OTHER PUBLICATIONS

Office Communication for U.S. Appl. No. 16/820,582 mailed Sep. 27, 2021, 25 Pages.
Office Communication for U.S. Appl. No. 16/989,025 mailed Jan. 19, 2022, 12 Pages.
Office Communication for U.S. Appl. No. 16/989,025 mailed May 23, 2022, 14 Pages.
Office Communication for U.S. Appl. No. 16/989,343 mailed Mar. 29, 2022, 5 Pages.
Office Communication for U.S. Appl. No. 17/214,555 mailed Mar. 21, 2023, 25 Pages.
Office Communication for U.S. Appl. No. 17/214,555 mailed Nov. 10, 2022, 21 Pages.
Office Communication for U.S. Appl. No. 17/226,947 mailed Dec. 30, 2021, 6 Pages.
Office Communication for U.S. Appl. No. 17/226,947 mailed Jul. 11, 2022, 13 Pages.
Office Communication for U.S. Appl. No. 17/318,423 mailed Mar. 29, 2022, 21 Pages.
Office Communication for U.S. Appl. No. 17/318,423 mailed Sep. 13, 2022, 15 Pages.
Office Communication for U.S. Appl. No. 17/318,423 mailed Sep. 22, 2022, 2 Pages.
Office Communication for U.S. Appl. No. 17/337,299 mailed Feb. 17, 2022, 14 Pages.
Office Communication for U.S. Appl. No. 17/337,299 mailed Oct. 21, 2021, 34 Pages.
Office Communication for U.S. Appl. No. 17/351,866 mailed Feb. 9, 2022, 9 Pages.
Office Communication for U.S. Appl. No. 17/351,866 mailed Oct. 18, 2021, 12 Pages.
Office Communication for U.S. Appl. No. 17/483,148 mailed Dec. 13, 2021, 28 Pages.
Office Communication for U.S. Appl. No. 17/515,963 mailed Feb. 1, 2023, 2 Pages.
Office Communication for U.S. Appl. No. 17/515,963 mailed Jan. 24, 2023, 8 Pages.
Office Communication for U.S. Appl. No. 17/515,963 mailed Oct. 7, 2022, 27 Pages.
Office Communication for U.S. Appl. No. 17/516,063 mailed Aug. 11, 2023, 11 Pages.
Office Communication for U.S. Appl. No. 17/516,063 mailed Jul. 31, 2023, 3 Pages.
Office Communication for U.S. Appl. No. 17/516,063 mailed May 19, 2023, 10 pages.
Office Communication for U.S. Appl. No. 17/516,063 mailed Oct. 31, 2022, 10 Pages.
Office Communication for U.S. Appl. No. 17/712,521 mailed Aug. 2, 2023, 14 Pages.
Office Communication for U.S. Appl. No. 17/712,521 mailed Mar. 21, 2023, 13 Pages.
Office Communication for U.S. Appl. No. 17/721,514 mailed Oct. 11, 2022, 2 Pages.
Office Communication for U.S. Appl. No. 17/721,514 mailed Sep. 20, 2022, 8 pages.
Office Communication for U.S. Appl. No. 17/722,217 mailed Jul. 15, 2022, 7 Pages.
Office Communication for U.S. Appl. No. 17/722,217 mailed Jun. 29, 2022, 23 Pages.
Office Communication for U.S. Appl. No. 17/861,373 mailed Jan. 11, 2023, 10 Pages.
Office Communication for U.S. Appl. No. 17/861,373 mailed Jan. 19, 2023, 2 Pages.
Office Communication for U.S. Appl. No. 17/861,373 mailed Sep. 9, 2022, 18 Pages.
Parsons, "Moving Across the Internet: Code-Bodies, Code-Corpses, and Network Architecture," May 9, 2010, 20 pages.
Shaver, Jim, "Decrypting TLS Browser Traffic with Wreshark the easy way", https://jimshaver.net/2015/02/11/decrypting-tls-browser-traffic-with-wireshark-the-easy-way/, Feb. 11, 2015, pp. 1-30.
Supplementary European Search Report for European Patent Application No. 19804040.4 mailed Jan. 25, 2022, 4 Pages.
Svoboda, Jakub, "Network Traffic Analysis with Deep Packet inspection Method," Masaryk University, Faculty of Informatics, Master's Thesis, 2014, 74 Pages.
Wade, Susan Marie, "Scada Honeynets: The attractiveness of honeypots as critical infrastructure security tools for the detection and analysis of advanced threats" (2011). Graduate Theses and Dissertations. 12138. https://lib.dr.iastate.edu/etd/12138, 67 Pages.
Zander et al., "Covert Channels and Countermeasures in Computer Network Protocols," Dec. 2007, 7 pages.
Examination Report for European Patent Application No. 16166907.2 mailed Dec. 19, 2019, 6 Pages.
Office Communication for U.S. Appl. No. 15/585,887 mailed Jan. 26, 2024, 44 Pages.
Office Communication for U.S. Appl. No. 17/516,063 mailed Feb. 7, 2024, 11 Pages.
Office Communication for U.S. Appl. No. 17/826,011 mailed Feb. 16, 2024, 6 Pages.
Office Communication for U.S. Appl. No. 17/516,529 mailed Feb. 29, 2024, 20 Pages.
Berners-Lee et al. "Uniform Resource Identifiers (URI): Generic Syntax" Network Working Group, Request for Comments: 2396, Aug. 1998, 40 pages.
Hamid et al., A Methodology to Develop Dynamic Cost-Centric Risk Impact Metrics, Dec. 2015, International Conference on Developments of E-Systems Engineering, pp. 53-59 (Year: 2015).
Kristol et al. "HTTP State Management Mechanism", Network Working Group, Request for Comments: 2109, Feb. 1997, 21 Pages.
Kristol et al. "HTTP State Management Mechanism", Network Working Group, Request for Comments: 2965, Oct. 2000, 26 Pages.
Intention to Grant for European Application No. 16166907.2 mailed on Jan. 20, 2023, 8 Pages.
Intention to Grant for European Application No. 17210995.1 mailed on Jun. 2, 2021, 8 Pages.
Intention to Grant for European Patent Application No. 19804040.4 mailed Jun. 23, 2022, 8 Pages.
Intention to Grant for European Patent Application No. 17210996.9 mailed Mar. 29, 2023, 10 Pages.
Intention to Grant for European Patent Application No. 19846527.0 mailed Apr. 5, 2023, 9 Pages.
International Preliminary Report on Patentability Chapter I for International Patent Application No. PCT/US2017/068585 mailed May 7, 2020, 8 Pages.
International Preliminary Report on Patentability Chapter I for International Patent Application No. PCT/US2017/068586 mailed Feb. 20, 2020, 11 Pages.
International Preliminary Report on Patentability Chapter I for International Patent Application No. PCT/US2018/030145 mailed Nov. 14, 2019, 8 Pages.
International Preliminary Report on Patentability Chapter I for International Patent Application No. PCT/US2019/018097 mailed Feb. 18, 2021, 8 Pages.
International Preliminary Report on Patentability Chapter I for International Patent Application No. PCT/US2019/030015 mailed Dec. 3, 2020, 5 Pages.
International Preliminary Report on Patentability Chapter I for International Patent Application No. PCT/US2021/051757 mailed Apr. 6, 2023, 7 Pages.
Office Communication for U.S. Appl. No. 16/525,290 mailed Jul. 28, 2021, 2 Pages.
Office Communication for U.S. Appl. No. 16/048,939 mailed on Apr. 12, 2019, 5 Pages.
Office Communication for U.S. Appl. No. 17/708,311 mailed on Dec. 21, 2022, 4 pages.
Office Communication for U.S. Appl. No. 17/708,311 mailed on Jun. 2, 2023, 16 pages.
Office Communication for U.S. Appl. No. 17/708,311 mailed on Jun. 20, 2022, 15 pages.
Office Communication for U.S. Appl. No. 17/708,311 mailed on Oct. 5, 2022, 15 pages.
Office Communication for U.S. Appl. No. 17/708,311 mailed on Sep. 13, 2023, 11 pages.

(56) References Cited

OTHER PUBLICATIONS

Office Communication for U.S. Appl. No. 11/679,356 mailed Dec. 11, 2009, 23 Pages.
Office Communication for U.S. Appl. No. 11/679,356 mailed Feb. 22, 2010, 3 Pages.
Office Communication for U.S. Appl. No. 11/679,356 mailed Jun. 22, 2009, 21 Pages.
Office Communication for U.S. Appl. No. 11/679,356 mailed Mar. 4, 2011, 8 Pages.
Office Communication for U.S. Appl. No. 11/679,356 mailed Sep. 9, 2010, 27 Pages.
Office Communication for U.S. Appl. No. 14/500,893 mailed Apr. 28, 2015, 6 Pages.
Office Communication for U.S. Appl. No. 14/500,893 mailed Aug. 31, 2015, 7 Pages.
Office Communication for U.S. Appl. No. 15/014,932 mailed Dec. 19, 2018, 2 Pages.
Office Communication for U.S. Appl. No. 15/457,886 mailed Oct. 12, 2018, 3 Pages.
Office Communication for U.S. Appl. No. 15/466,248 mailed Sep. 27, 2018, 3 Pages.
Office Communication for U.S. Appl. No. 15/585,887 mailed Apr. 27, 2018, 25 Pages.
Office Communication for U.S. Appl. No. 15/585,887 mailed Jan. 15, 2019, 6 Pages.
Office Communication for U.S. Appl. No. 15/585,887 mailed Mar. 8, 2018, 6 Pages.
Office Communication for U.S. Appl. No. 15/585,887 mailed Nov. 18, 2019, 9 Pages.
Office Communication for U.S. Appl. No. 15/585,887 mailed Oct. 23, 2018, 27 Pages.
Office Communication for U.S. Appl. No. 15/585,887 mailed Sep. 3, 2019, 29 Pages.
Office Communication for U.S. Appl. No. 15/675,216 mailed Mar. 22, 2018, 9 Pages.
Office Communication for U.S. Appl. No. 15/694,229 mailed Jan. 9, 2019, 11 Pages.
Office Communication for U.S. Appl. No. 15/694,229 mailed Jul. 26, 2018, 16 Pages.
Office Communication for U.S. Appl. No. 15/793,880 mailed Mar. 1, 2018, 9 Pages.
Office Communication for U.S. Appl. No. 15/891,273 mailed Mar. 13, 2019, 6 Pages.
Office Communication for U.S. Appl. No. 15/891,311 mailed Dec. 11, 2018, 4 Pages.
Office Communication for U.S. Appl. No. 15/891,311 mailed Mar. 13, 2019, 2 Pages.
Office Communication for U.S. Appl. No. 15/893,519 mailed Dec. 12, 2018, 4 Pages.
Office Communication for U.S. Appl. No. 15/893,519 mailed Feb. 1, 2019, 21 Pages.
Office Communication for U.S. Appl. No. 15/893,519 mailed May 4, 2018, 10 Pages.
Office Communication for U.S. Appl. No. 15/893,519 mailed Sep. 27, 2018, 17 Pages.
Office Communication for U.S. Appl. No. 16/100,116 mailed Jul. 10, 2019, 4 Pages.
Office Communication for U.S. Appl. No. 15/971,843 mailed Oct. 27, 2020, 11 Pages.
Office Communication for U.S. Appl. No. 15/984,197 mailed Aug. 31, 2018, 25 Pages.
Office Communication for U.S. Appl. No. 16/048,939 mailed Dec. 5, 2019, 9 Pages.
Office Communication for U.S. Appl. No. 16/048,939 mailed Feb. 18, 2020, 6 Pages.
Office Communication for U.S. Appl. No. 16/048,939 mailed Jun. 20, 2019, 8 Pages.
Office Communication for U.S. Appl. No. 16/048,939 mailed Mar. 26, 2020, 6 Pages.
Office Communication for U.S. Appl. No. 16/048,939 mailed Sep. 19, 2018, 9 Pages.
Office Communication for U.S. Appl. No. 16/100,116 mailed May 30, 2019, 5 Pages.
Office Communication for U.S. Appl. No. 16/100,116 mailed Nov. 15, 2018, 7 Pages.
Office Communication for U.S. Appl. No. 16/107,509 mailed Apr. 1, 2019, 21 Pages.
Office Communication for U.S. Appl. No. 16/107,509 mailed Aug. 21, 2019, 25 Pages.
Office Communication for U.S. Appl. No. 16/107,509 mailed Jan. 23, 2020, 12 Pages.
Office Communication for U.S. Appl. No. 16/107,509 mailed Jun. 14, 2019, 5 Pages.
Office Communication for U.S. Appl. No. 16/107,509 mailed Oct. 26, 2018, 26 Pages.
Office Communication for U.S. Appl. No. 16/113,442 mailed Jun. 5, 2019, 7 Pages.
Office Communication for U.S. Appl. No. 16/113,442 mailed Nov. 6, 2018, 10 Pages.
Office Communication for U.S. Appl. No. 16/174,051 mailed Jan. 29, 2019, 21 Pages.
Office Communication for U.S. Appl. No. 16/384,697 mailed May 30, 2019, 17 Pages.
Office Communication for U.S. Appl. No. 16/384,697 mailed Oct. 17, 2019, 8 Pages.
Office Communication for U.S. Appl. No. 16/424,387 mailed Feb. 24, 2020, 15 Pages.
Office Communication for U.S. Appl. No. 16/424,387 mailed Nov. 24, 2020, 23 Pages.
Office Communication for U.S. Appl. No. 16/459,472 mailed Aug. 14, 2019, 24 Pages.
Office Communication for U.S. Appl. No. 16/459,472 mailed Feb. 3, 2020, 18 Pages.
Office Communication for U.S. Appl. No. 16/525,290 mailed Jun. 15, 2021, 4 Pages.
Office Communication for U.S. Appl. No. 16/525,290 mailed Mar. 12, 2020, 10 Pages.
Office Communication for U.S. Appl. No. 16/525,290 mailed Mar. 31, 2021, 11 Pages.
Office Communication for U.S. Appl. No. 16/525,290 mailed Oct. 31, 2019, 9 Pages.
Office Communication for U.S. Appl. No. 16/525,290 mailed Sep. 23, 2020, 10 Pages.
Office Communication for U.S. Appl. No. 16/532,275 mailed Oct. 24, 2019, 29 Pages.
Office Communication for U.S. Appl. No. 16/543,243 mailed Apr. 7, 2020, 22 Pages.
Office Communication for U.S. Appl. No. 16/543,243 mailed Dec. 16, 2020, 13 Pages.
Office Communication for U.S. Appl. No. 16/543,243 mailed Sep. 27, 2019, 24 Pages.
Office Communication for U.S. Appl. No. 16/560,886 mailed Apr. 22, 2020, 10 Pages.
Office Communication for U.S. Appl. No. 16/560,886 mailed Dec. 6, 2019, 17 Pages.
Office Communication for U.S. Appl. No. 16/565,109 mailed Jan. 19, 2021, 9 Pages.
Office Communication for U.S. Appl. No. 16/565,109 mailed May 8, 2020, 19 Pages.
Office Communication for U.S. Appl. No. 16/565,109 mailed Nov. 27, 2019, 18 Pages.
Office Communication for U.S. Appl. No. 16/679,055 mailed Feb. 14, 2020, 32 Pages.
Office Communication for U.S. Appl. No. 16/679,055 mailed Jul. 26, 2021, 34 Pages.
Office Communication for U.S. Appl. No. 16/679,055 mailed Jun. 3, 2022, 34 Pages.
Office Communication for U.S. Appl. No. 16/679,055 mailed Mar. 16, 2021, 33 Pages.
Office Communication for U.S. Appl. No. 16/679,055 mailed Mar. 2, 2022, 35 Pages.

(56) References Cited

OTHER PUBLICATIONS

Office Communication for U.S. Appl. No. 16/679,055 mailed May 11, 2022, 3 Pages.
Office Communication for U.S. Appl. No. 16/679,055 mailed Nov. 12, 2021, 34 Pages.
Office Communication for U.S. Appl. No. 16/679,055 mailed Oct. 12, 2021, 3 Pages.
Office Communication for U.S. Appl. No. 16/679,055 mailed Sep. 21, 2022, 25 Pages.
Office Communication for U.S. Appl. No. 16/679,055 mailed Sep. 28, 2022, 2 Pages.
Office Communication for U.S. Appl. No. 16/679,055 mailed Sep. 4, 2020, 5 Pages.
Office Communication for U.S. Appl. No. 16/718,050 mailed Feb. 27, 2020, 21 Pages.
Office Communication for U.S. Appl. No. 16/718,050 mailed Jul. 27, 2021, 23 Pages.
Postel Jon, "Transmission Control Protocol", Darpa Internet Program, RFC: 793, Sep. 1981, 91 pages.
Office Communication for U.S. Appl. No. 16/113,442 mailed Mar. 22, 2019, 9 Pages.
Office Communication for U.S. Appl. No. 16/243,001 mailed Apr. 3, 2019, 16 Pages.
Office Communication for U.S. Appl. No. 16/391,216 mailed Jul. 8, 2019, 15 Pages.
Office Communication for U.S. Appl. No. 16/391,216 mailed Oct. 24, 2019, 16 Pages.
Office Communication for U.S. Appl. No. 16/424,387 mailed Oct. 18, 2019, 5 Pages.
Office Communication for U.S. Appl. No. 16/442,257 mailed Jul. 16, 2019, 11 Pages.
Office Communication for U.S. Appl. No. 16/989,025 mailed Jun. 8, 2022, 2 Pages.
Office Communication for U.S. Appl. No. 17/337,299 mailed Jun. 15, 2022, 2 Pages.
Office Communication for U.S. Appl. No. 17/483,148 mailed Mar. 2, 2022, 2 Pages.
Office Communication for U.S. Appl. No. 17/712,521 mailed Nov. 13, 2023, 8 Pages.
Office Communication for U.S. Appl. No. 17/712,521 mailed Oct. 11, 2023, 4 Pages.
Office Communication for U.S. Appl. No. 17/826,011 mailed Sep. 14, 2023, 13 Pages.
Office Communication for U.S. Appl. No. 15/466,248 mailed Apr. 15, 2019, 4 Pages.
Office Communication for U.S. Appl. No. 15/466,248 mailed Feb. 7, 2019, 32 Pages.
Office Communication for U.S. Appl. No. 15/585,887 mailed Sep. 11, 2023, 5 Pages.
Office Communication for U.S. Appl. No. 17/826,011 mailed Dec. 26, 2023, 11 Pages.
Examination Report for European Patent Application No. 16166907.2 mailed Mar. 9, 2018, 4 Pages.
Examination Report for European Patent Application No. 17210996.9 mailed May 21, 2021, 6 Pages.
Examination Report for European Patent Application No. 17210996.9 mailed May 27, 2020, 3 Pages.
Extended European Search Report for European Patent Application No. 16166907.2 mailed Sep. 30, 2016, 7 Pages.
Extended European Search Report for European Patent Application No. 17210995.1 mailed Jul. 6, 2018, 11 Pages.
Extended European Search Report for European Patent Application No. 17210996.9 mailed Jun. 13, 2018, 7 Pages.
Extended European Search Report for European Patent Application No. 19846527.0 mailed Apr. 4, 2022, 9 Pages.
International Search Report and Written Opinion for International Patent Application No. PCT/US2017/068585 mailed Jul. 4, 2018, 9 Pages.

International Search Report and Written Opinion for International Patent Application No. PCT/US2017/068586 mailed Aug. 9, 2018, 13 Pages.
International Search Report and Written Opinion for International Patent Application No. PCT/US2018/030145 mailed Aug. 10, 2018, 10 Pages.
International Search Report and Written Opinion for International Patent Application No. PCT/US2019/018097 mailed May 28, 2019, 9 Pages.
International Search Report and Written Opinion for International Patent Application No. PCT/US2019/030015 mailed Aug. 7, 2019, 6 Pages.
International Search Report and Written Opinion for International Patent Application No. PCT/US2021/051757 mailed Jan. 11, 2022, 9 Pages.
Office Communication for U.S. Appl. No. 16/525,290 mailed Jul. 9, 2021, 7 Pages.
Office Communication for U.S. Appl. No. 16/532,275 mailed Apr. 20, 2020, 8 Pages.
Office Communication for U.S. Appl. No. 15/855,769 mailed on May 1, 2019, 20 Pages.
Office Communication for U.S. Appl. No. 16/048,939 mailed on Jan. 31, 2019, 7 Pages.
Office Communication for U.S. Appl. No. 16/989,343 mailed Aug. 11, 2022, 9 Pages.
Office Communication for U.S. Appl. No. 16/989,343 mailed Aug. 17, 2022, 5 Pages.
Office Communication for U.S. Appl. No. 17/483,435 mailed Nov. 30, 2021, 21 Pages.
Office Communication for U.S. Appl. No. 17/721,514 mailed Jul. 21, 2022, 7 Pages.
Office Communication for U.S. Appl. No. 11/683,643 mailed Aug. 25, 2011, 43 Pages.
"Kerberos Overview—An Authentication Service for Open Network Systems," Cisco Systems, Inc., Jan. 19, 2006, nttps://A1ww.cisco.comlclen/uslsupport/docs/security-vpnikerberos/16087-1.htrni, Accessed: Feb. 9, 2022, pp. 1-16.
Beckett et al., "New Sensing Technique for Detecting Application Layer DDOS Attacks Targeting Back-end Database Resources," IEEE International Conference on Communications (ICC 2017), May 2017, 7 Pages.
Conry-Murray, Andrew, "Security Event Management Gets Specialized," Network Magazine, CMP Media, vol. 20, Nov. 2005, 6 Pages.
Digital Imaging and Communications in Medicine (DICOM), Part 6: Data Dictionary, PS 3.6-2011. 2011, http://dicorn.nerna.org/Dicom12011 111_06pu.pdf, pp. 1-216.
Fuertes, "Evaluation of OSPF Extensions in MANET Routing," Paris, 2007, 192 pages.
Handel et al., "Hiding Data in the OSI Network Model", Los Alamos, New Mexico, 1996, vol. 1174, pp. 23-38.
Handley et al., "Network Intrusion Detection: Evasion, Traffic Normalization, and End-to-End Protocol Semantics," 2011, International Computer Science Institute, 17 pages.
Health Level Seven, Version 2.6, Appendix A. Nov. 2007, https://www.n17.orglspecial/committees/vc.)cabl V26.--Appendix A.pdf, 255 Pages.
Information Sciences Institute, "Internet Protocol Darpa Internet Program Protocol Specification," Sep. 1981, 36 pages.
Lin, Mark, "An Overview of Session Hijacking at the Network and Application Levels," Jan. 18, 2005, 16 Pages.
Mozilla Developer Network, "NSS Key Log Format," https://developer.mozilla,orgien-USIclocs/Mozilla/ProjectsINSSIKey_Log_Format, Jan. 8, 2010, p. 1.
Office Communication for U.S. Appl. No. 15/207,213 mailed Feb. 23, 2017, 24 Pages.
Office Communication for U.S. Appl. No. 15/207,213 mailed Jun. 1, 2017, 24 Pages.
Office Communication for U.S. Appl. No. 15/207,213 mailed May 8, 2017, 6 Pages.
Office Communication for U.S. Appl. No. 15/207,213 mailed Oct. 25, 2016, 18 Pages.

(56) References Cited

OTHER PUBLICATIONS

Office Communication for U.S. Appl. No. 15/219,016 mailed Mar. 16, 2017, 9 Pages.
Office Communication for U.S. Appl. No. 15/289,760 mailed Dec. 12, 2016, 12 Pages.
Office Communication for U.S. Appl. No. 15/356,381 mailed Jan. 6, 2017, 57 Pages.
Office Communication for U.S. Appl. No. 15/356,381 mailed Jul. 3, 2017, 21 Pages.
Office Communication for U.S. Appl. No. 15/443,868 mailed Apr. 27, 2017, 7 Pages.
Office Communication for U.S. Appl. No. 15/457,886 mailed Jul. 18, 2018, 11 Pages.
Office Communication for U.S. Appl. No. 15/457,886 mailed Mar. 20, 2019, 9 Pages.
Office Communication for U.S. Appl. No. 15/466,248 mailed Jan. 11, 2018, 2 Pages.
Office Communication for U.S. Appl. No. 15/466,248 mailed Jul. 11, 2018, 31 Pages.
Office Communication for U.S. Appl. No. 15/466,248 mailed Jun. 5, 2017, 30 Pages.
Office Communication for U.S. Appl. No. 15/466,248 mailed Mar. 8, 2018, 34 Pages.
Office Communication for U.S. Appl. No. 15/466,248 mailed May 16, 2019, 33 Pages.
Office Communication for U.S. Appl. No. 15/466,248 mailed Oct. 18, 2018, 31 Pages.
Office Communication for U.S. Appl. No. 15/466,248 mailed Oct. 3, 2017, 34 Pages.
Office Communication for U.S. Appl. No. 15/466,248 mailed Sep. 10, 2019, 27 Pages.
Office Communication for U.S. Appl. No. 15/585,887 mailed Aug. 17, 2021, 41 Pages.
Office Communication for U.S. Appl. No. 15/585,887 mailed Dec. 22, 2022, 38 Pages.
Office Communication for U.S. Appl. No. 15/585,887 mailed Jan. 22, 2020, 28 Pages.
Office Communication for U.S. Appl. No. 15/585,887 mailed Jun. 27, 2017, 24 Pages.
Office Communication for U.S. Appl. No. 15/585,887 mailed Jun. 7, 2023, 43 pages.
Office Communication for U.S. Appl. No. 15/585,887 mailed Mar. 20, 2019, 26 Pages.
Office Communication for U.S. Appl. No. 15/585,887 mailed Mar. 24, 2022, 40 Pages.
Office Communication for U.S. Appl. No. 15/585,887 mailed Mar. 26, 2021, 31 Pages.
Office Communication for U.S. Appl. No. 15/585,887 mailed Nov. 2, 2021, 4 Pages.
Office Communication for U.S. Appl. No. 15/585,887 mailed Nov. 21, 2022, 6 Pages.
Office Communication for U.S. Appl. No. 15/585,887 mailed Nov. 28, 2017, 23 Pages.
Office Communication for U.S. Appl. No. 15/585,887 mailed Sep. 1, 2022, 39 Pages.
Office Communication for U.S. Appl. No. 15/671,060 mailed May 8, 2019, 19 Pages.
Office Communication for U.S. Appl. No. 15/675,216 mailed Aug. 28, 2018, 14 Pages.
Office Communication for U.S. Appl. No. 15/675,216 mailed Jan. 29, 2019, 18 Pages.
Office Communication for U.S. Appl. No. 15/675,216 mailed Jun. 7, 2018, 4 Pages.
Office Communication for U.S. Appl. No. 15/675,216 mailed Nov. 20, 2017, 7 Pages.
Office Communication for U.S. Appl. No. 15/690,135 mailed Jan. 18, 2018, 6 Pages.
Office Communication for U.S. Appl. No. 15/690,135 mailed May 22, 2018, 16 Pages.
Office Communication for U.S. Appl. No. 15/855,769 mailed Feb. 5, 2019, 21 Pages.
Office Communication for U.S. Appl. No. 15/891,273 mailed Jan. 15, 2019, 23 Pages.
Office Communication for U.S. Appl. No. 15/891,273 mailed Jun. 19, 2018, 20 Pages.
Office Communication for U.S. Appl. No. 15/891,273 mailed May 28, 2019, 14 Pages.
Office Communication for U.S. Appl. No. 15/891,311 mailed Apr. 23, 2018, 18 Pages.
Office Communication for U.S. Appl. No. 15/891,311 mailed Jan. 29, 2019, 2 Pages.
Office Communication for U.S. Appl. No. 15/891,311 mailed Sep. 24, 2018, 14 Pages.
Office Communication for U.S. Appl. No. 15/892,327 mailed Apr. 23, 2018, 6 Pages.
Office Communication for U.S. Appl. No. 15/971,843 mailed Jul. 28, 2021, 9 Pages.
Office Communication for U.S. Appl. No. 15/971,843 mailed Mar. 26, 2020, 14 Pages.
Office Communication for U.S. Appl. No. 15/971,843 mailed May 5, 2021, 9 Pages.
Office Communication for U.S. Appl. No. 15/971,843 mailed Oct. 22, 2019, 15 Pages.

* cited by examiner

AUTOMATED PREEMPTIVE POLYMORPHIC DECEPTION

CROSS-REFERENCE TO RELATED APPLICATIONS

This Utility patent application is a Continuation of U.S. patent application Ser. No. 17/516,529 filed on Nov. 1, 2021, now U.S. Pat. No. 12,107,888 issued on Oct. 1, 2024, which is a Continuation of U.S. patent application Ser. No. 16/718, 050 filed on Dec. 17, 2019, now U.S. Pat. No. 11,165,823 issued on Nov. 2, 2021, the benefit of the filing date of which is hereby claimed under 35 U.S.C. § 120 and the contents of which are each further incorporated in entirety by reference.

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from seven to four, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

Networks of organizations often are attacked by malicious actors from external or internal locations. Vigilant organizations employ a variety of defenses or security mechanisms to help ensure the safety or integrity of the their networks or the data stored on networked devices or computers. In some cases, because attackers may continually update their tactics, it may be necessary for organizations to continually update their defenses. In some cases, organizations may employ one or more deception techniques to thwart attacks or learn more about the attackers. However, one or more factors may make deceptive tactics difficult, including the scale or size or modern networks, the dynamic nature of modern networking environments, growing sophistication of attackers or attacks, or the like. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
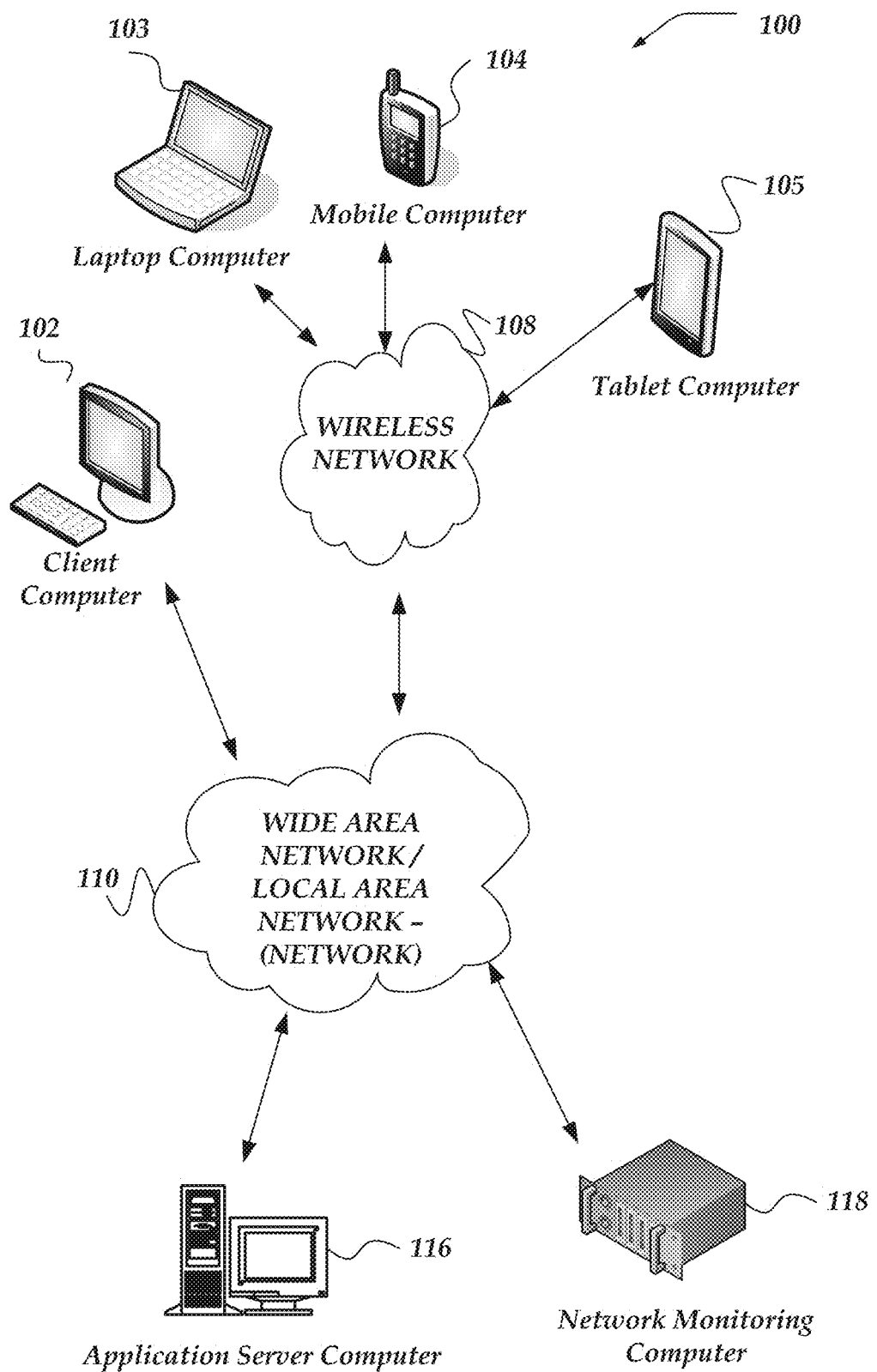
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, *Julia*, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the term "tuple" refers to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like. In cases, related flows may be flows in different networks or network segments that may be associated the same user, application, client computer, source, destination, or the like.

As used herein, the terms "network monitor", "network monitoring computer", or "NMC" refer to an application (software, hardware, or some combination) that is arranged to monitor and record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application life-cycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, inter-networking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in wire traffic on a particular network segment or virtual local area network (VLAN). Also, for at least some of the various embodiments, observation ports may provide NMCs network packet copies through a port mirror on a managed Ethernet switch, e.g., a Switched Port Analyzer (SPAN) port, or a Roving Analysis Port (RAP).

As used herein, the term "honeypot trap" refers one or more deceptions that may be targeted at deceiving attackers. Typically, honeypot traps may be employed to trick attackers into believing that they have accessed interesting or valuable resources in network they are attacking. Also, honeypot traps may be designed to collect metrics or other information about the attack or attackers to enable researchers to learn more about the attackers or attack. Such information may be used to identify the source of the attacks or to help improve defenses against subsequent attacks. For example, honeypot traps may include one or more computers or computer systems intended to mimic likely targets of attackers.

As used herein, the term "anomalous activity" refers to network activity that triggers one or more alarms or otherwise meets conditions defined to be anomalous by an organization. NMCs may be configured to recognize various patterns of behavior that may be considered anomalous by the organization that owns or operates a computer network. For example, such activity may include, port scans, malformed queries or requests, patterns of activity associated with known exploits, or the like. NMCs may be arranged to evaluate observed behavior using pattern matching, machine-learning classifiers, rules, protocol state machines, or the like, to identify anomalous activity.

As used herein, the term "attack" refers to anomalous activity that is determined to be a malicious intrusion or other type of ongoing exploit or attempted exploit that has been determine harmful enough to require an active response to prevent or reduce the harm that may be caused by the activity. NMCs may be arranged to evaluate observed behavior using pattern matching, machine-learning classifiers, rules, protocol state machines, or the like, to determine if anomalous activity ripens into an attack.

As used herein, the term "attack profile" refers to data structures that represent various characteristics of a pending attack. NMCs may be arranged to map metrics or network traffic characteristics to one or more field values in of the attack profile. Attack profiles are not limited to a particular set of fields or data structures. Attack profiles may be considered data structures that include information about the attack that may be derived from various sources, including monitored network traffic, as described in more detail below.

As used herein, the term "flow profile" refers to data structures that represent various characteristics of a portion of network traffic being monitored by NMCs. In some cases, particular flows may be distinguished by tuple information, or the like, that is associated with a portion of network traffic. Flow profiles are data structures that include fields or values based on a mapping of observed network traffic characteristics to fields in the flow profile, as described in more detail below.

As used herein, the term "response profile" refers to data structures that include information describing or defining information about the type of actions that should be taken in response to a pending attack. Generally, response profiles include instructions or configuration information associated with providing or deploying honeypot traps for pending attacks. Response profiles may include various information for selecting honeypot traps, configuring honeypot traps, monitoring honeypot traps, or the like, as described in more detail below.

As used herein the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed monitoring network traffic using one or more network monitoring computers. In one or more of the various embodiments, network traffic associated with a plurality of entities in one or more networks may be monitored. In one or more of the various embodiments, one or more anomalous events may be classified based on the monitored network traffic and one or more attack models such that the classification determines that one or more targets of the one or more anomalous events may be currently subject to one or more attacks by one or more entities communicating on the one or more networks. In one or more of the various embodiments, determining the one or more targets may include determining one or more of one or more target network addresses, one or more target applications, one or more target users, one or more target user roles, one or more target assets, one or more target data stores, or one or more target file systems.

In one or more of the various embodiments, a honeypot trap may be provided in the one or more networks based on the one or more classified events such that the honeypot trap mimics one or more characteristics of the one or more targets. In one or more of the various embodiments, providing the honeypot trap may include: determining network information associated with the one or more anomalous events; modifying the honeypot trap based on the network information; deploying the further modified honeypot trap based on the network information; or the like.

In one or more of the various embodiments, one or more portions of the network traffic associated with the honeypot trap may be monitored. In one or more of the various embodiments, monitoring the one or more portions of the network traffic associated with the honeypot trap may include determining a number of the one or more attacks that may be attracted to one or more honeypot trap. And, in some embodiments, scoring the one or more honeypot traps based on the number of attracted attacks such that each honeypot trap may be scored higher than the one or more honeypot traps that attract fewer attackers, and such that each honeypot trap may be scored lower than the one or more honeypot traps that attract more attackers.

In one or more of the various embodiments, one or more characteristics of the one or more attacks may be determined based on the monitored one or more portions of network traffic such that the honeypot trap may be separate or isolated from the one or more network computers.

In one or more of the various embodiments, providing one or more other honeypot traps based on the monitored network traffic. In one or more of the various embodiments, the one or more other honeypot traps may be deployed based on the monitored network traffic.

In one or more of the various embodiments, one or more metrics associated with the honeypot trap and one or more metrics associated with the one or more other honeypot traps may be correlated.

In one or more of the various embodiments, false information based on one or more characteristics of the one or more targets may be generated such that the false information includes one or more of, email addresses, location names, street addresses, telephone numbers, payroll information, product descriptions, network address information, or hostname information, that are based on an organization that is a target of the one or more anomalous events. And, in some embodiments, the false information may be deployed on the honeypot trap.

In one or more of the various embodiments, one or more subsequent anomalous events may be predicted based on the one or more anomalous events based on the one or more attack models. In some embodiments, one or more secondary honeypot traps that are associated with the honeypot trap based on the one or more predicted subsequent anomalous events may be provided. And, in some embodiments, one or more portions of the network traffic that are associated with the one or more secondary honeypot traps may be monitored.

In one or more of the various embodiments, one or more reports that include information based on the one or more characteristics of the one or more attacks may be generated.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
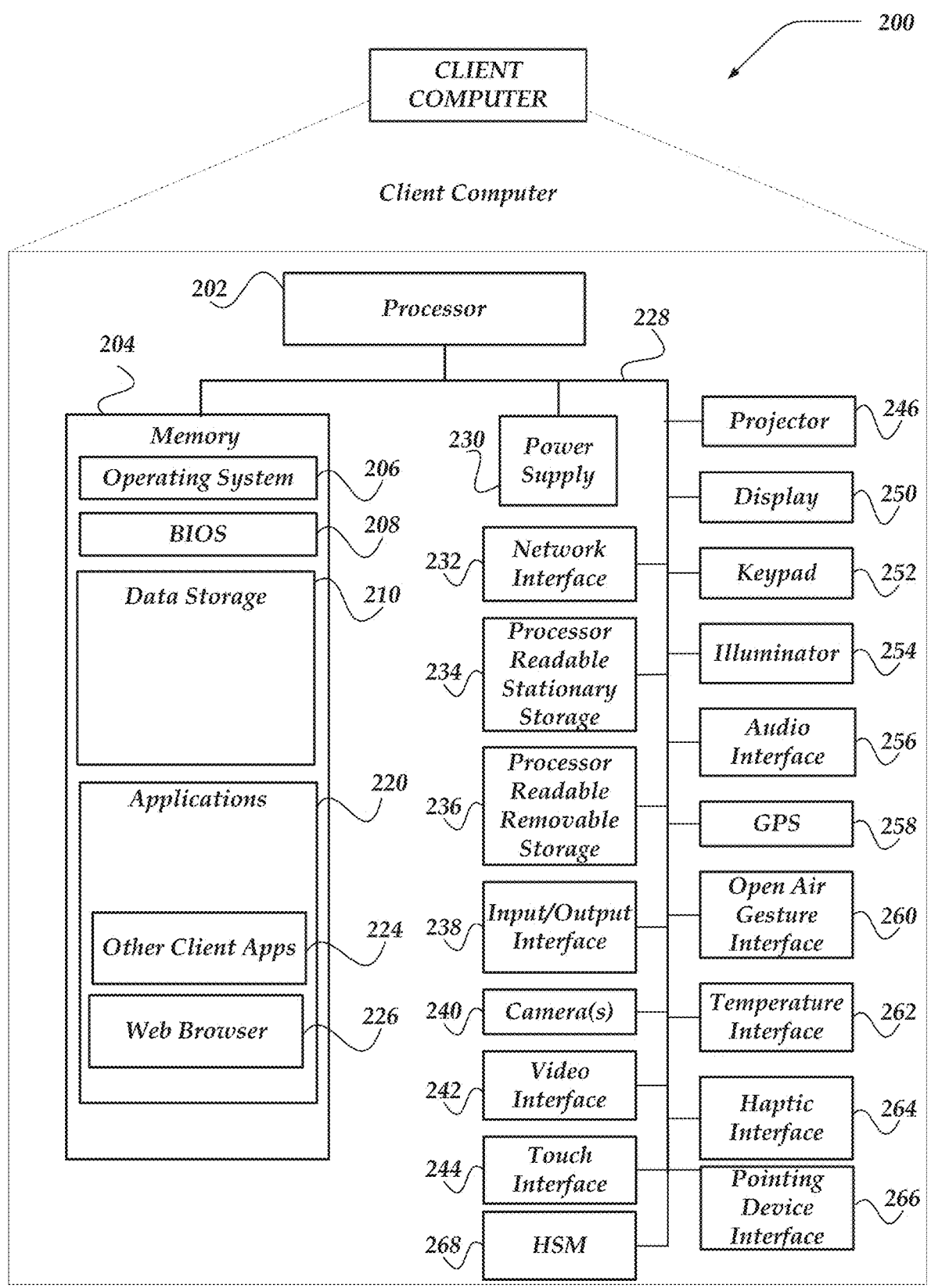
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
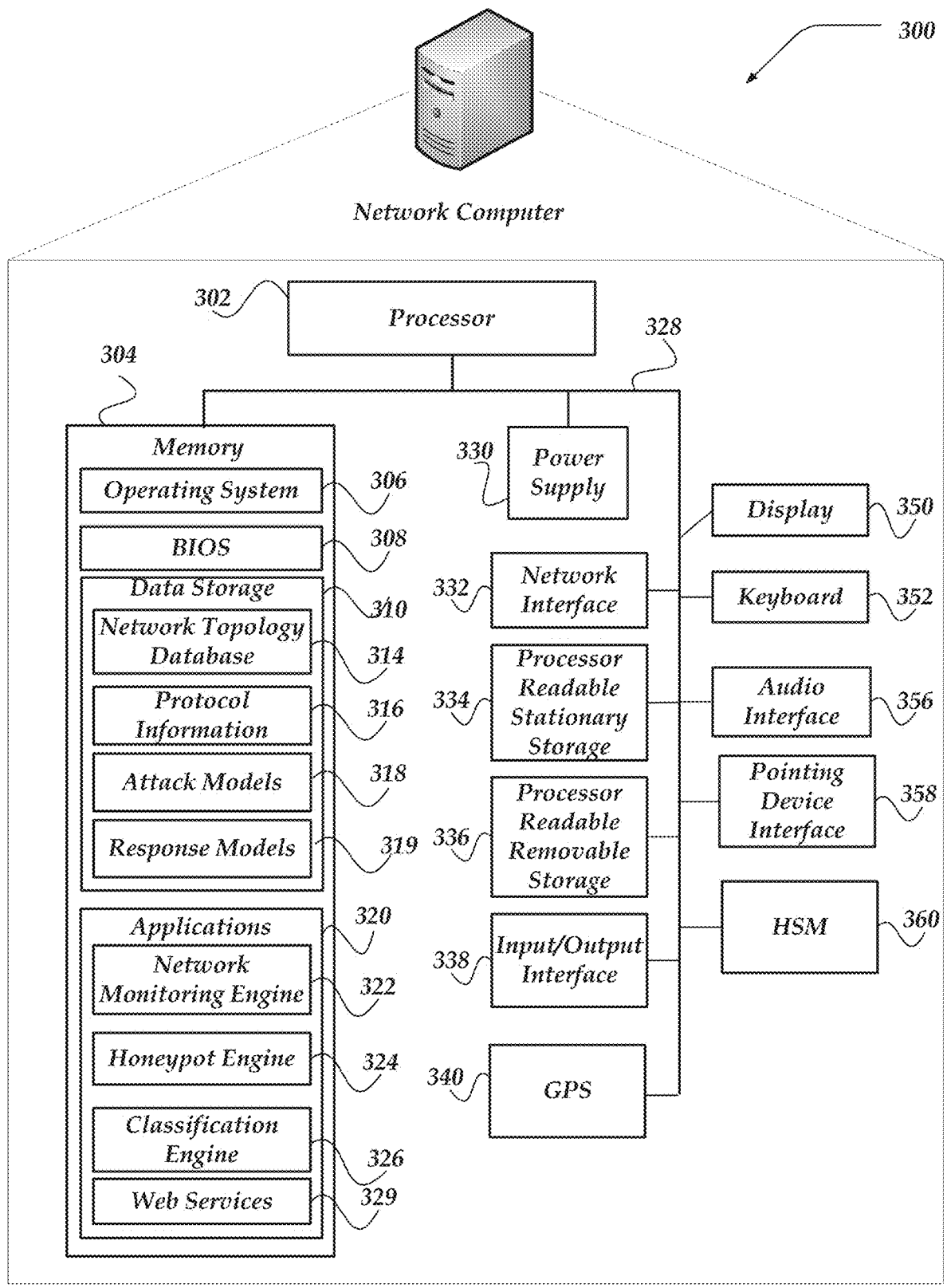
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, honeypot engine 324, classification engine 326, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, attack models 318, or the like. In some embodiments, network topology database 314 may be a data store that contains information related to the topology of one or more network monitored by a NMC, including one or more device relation models. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment. Also, in some embodiments, attack models 318 may store various analytical models that are arranged to infer various characteristics of pending attacks based on network traffic, including network traffic that is associated with one or more honeypot traps.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, honeypot engine 324, classification engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, network monitoring engine 322, honeypot engine 324, classification engine 326, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, honeypot engine 324, classification engine 326, web services 329, or the like, may be provisioned and de-commissioned automatically.

Also, in one or more of the various embodiments, network monitoring engine 322, honeypot engine 324, classification engine 326, web services 329, or the like, may be located in virtual servers running in a cloud-based computing environment rather than being tied to one or more specific physical network computers. Likewise, in some embodiments, one or more of network monitoring engine 322, honeypot engine 324, classification engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
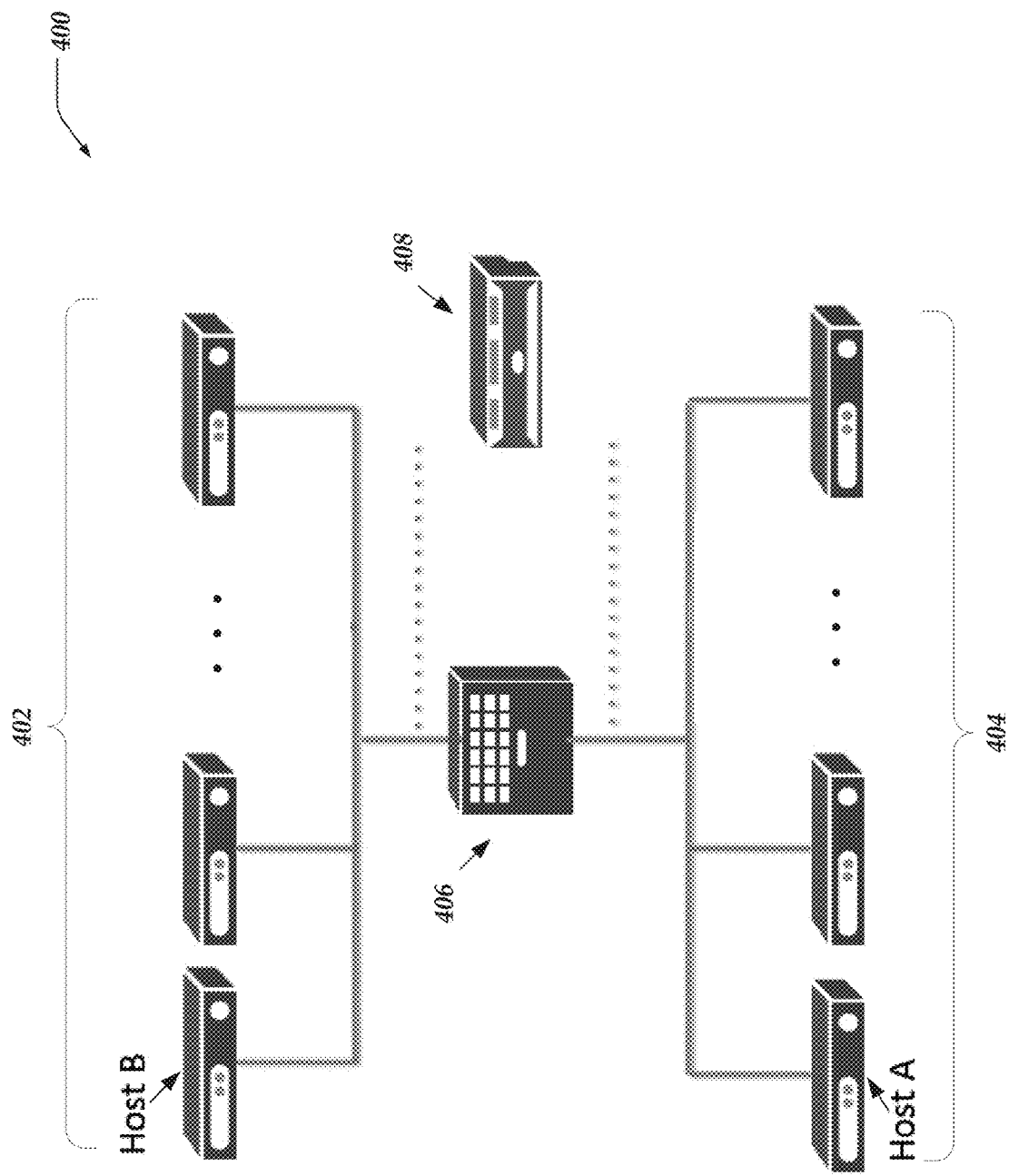
FIG. 4 illustrates a logical architecture of a system for automated preemptive polymorphic deception in accordance with one or more of the various embodiments.

FIG. 4 illustrates a logical architecture of system 400 for automated preemptive polymorphic deception in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network traffic) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

Figure 5:
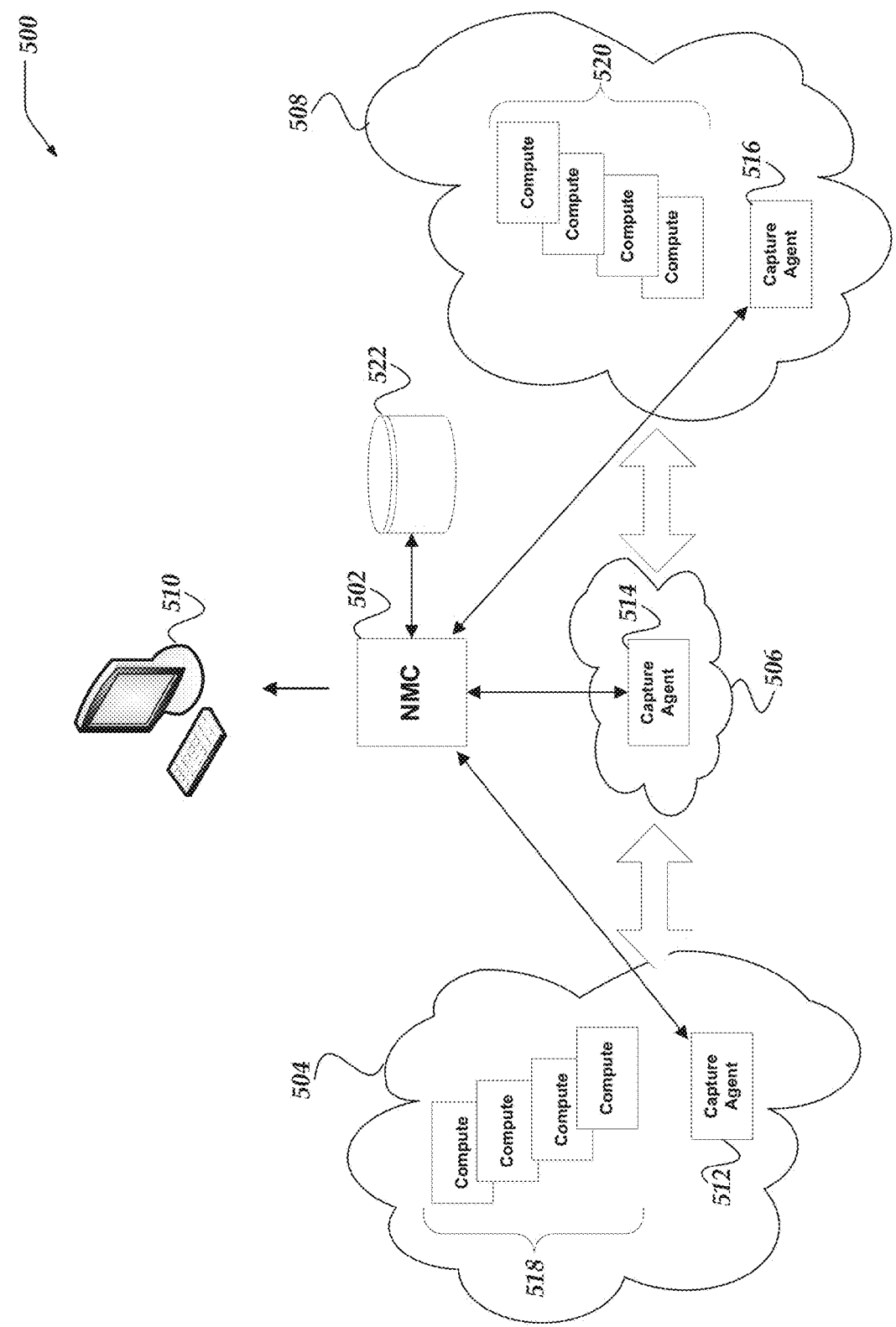
FIG. 5 illustrates a logical schematic of a system for automated preemptive polymorphic deception in accordance with one or more of the various embodiments.

FIG. 5 illustrates a logical schematic of system 500 for automated preemptive polymorphic deception in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, co-location computing environments, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters pf similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. (See, FIG. 4, as well).

In this example, for one or more of the various embodiments, capture agents, such as capture agent 512 may be arranged capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522.

Figure 6A:
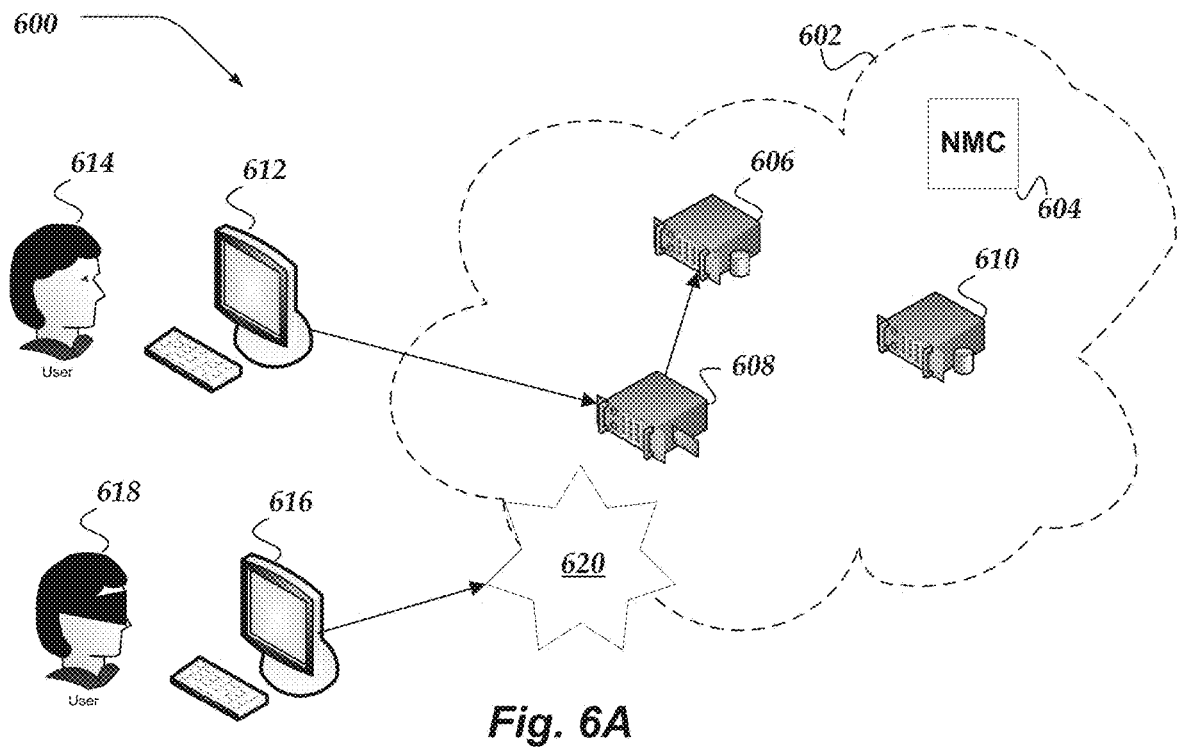
FIG. 6A illustrates a logical representation of a system for automated preemptive polymorphic deception in accordance with one or more of the various embodiments.
Figure 6B:
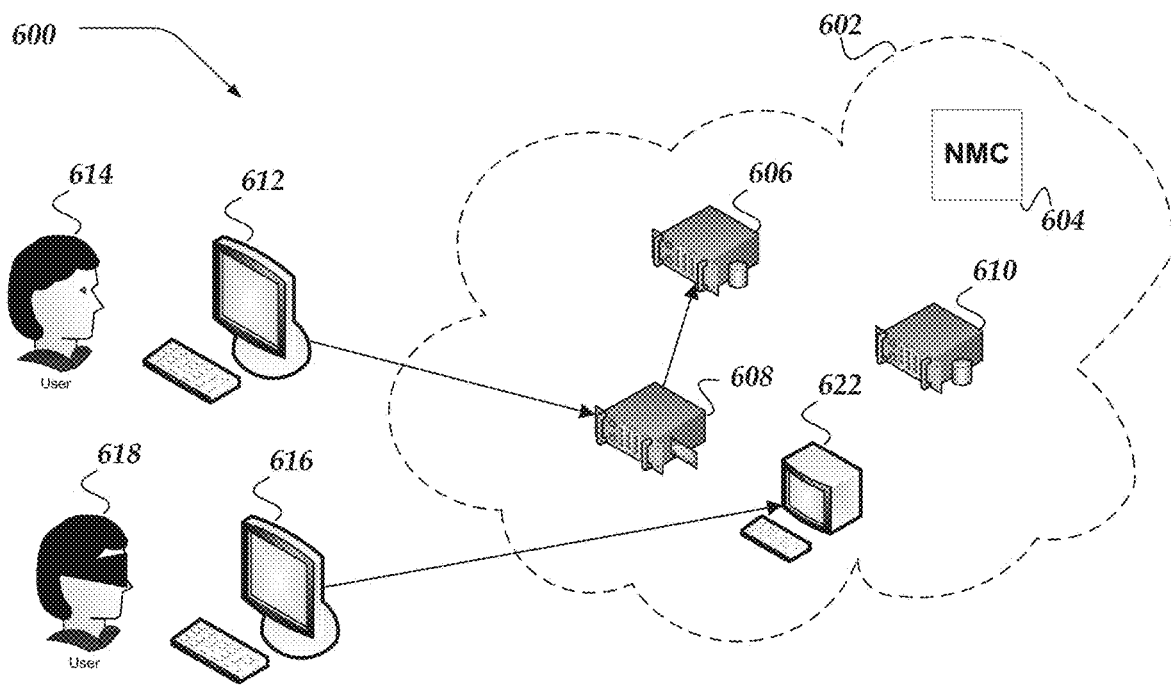
FIG. 6B illustrates a logical schematic of a system if an NMC has engaged in automated preemptive polymorphic deception in accordance with one or more of the various embodiments.

FIGS. 6A and 6B illustrate automated preemptive polymorphic deception in accordance with one or more of the various embodiments. In short, FIG. 6A represents a system under attack and FIG. 6B represents the same system if the NMC has initiated automated preemptive polymorphic deception to defend against the attack by deploying a honeypot trap.

FIG. 6A illustrates a logical representation of system 600 for automated preemptive polymorphic deception in accordance with one or more of the various embodiments. In this example, network 602 may be considered similar to network 108 or network 110. In some embodiments, network 602 may represent a network or sub-network that NMC 604 may be arranged to monitor. Accordingly, in some embodiments, one or more NMCs, such as, NMC 604 may be arranged to passively monitor some or all of the network traffic that may occur in network 602.

In one or more of the various embodiments, system 600 may include one or more entities, such as, network computer 606, network computer 608, or network computer 610. Further, in this example, client computers, such as, client computer 612 may be arranged to communicate with one or more of the entities in network 602. In this example, user 614 represents one or more authorized users that may be accessing network 602 or its entities.

Also, in some embodiments, one or more of network computer 606, network computer 608, or network computer 610, as well as, some or all of network 602 may be considered to be in one or more cloud computing environments. Likewise, in some embodiments, one or more of network computer 606, network computer 608, or network computer 610, as well as, some or all of network 602 may be considered to be located in remote data centers, local data centers, co-location computing environments, or the like, or combination thereof.

In this example, for some embodiments, client computer 616 (along with user 618) represent a source of anomalous activity, such as, activity 620, that may be directed to performing one or more malicious actions. In this example, anomalous activity 620 may represent activity that originates inside or outside one or more monitored networks. In this example, the attack is illustrated as originating outside of network 602, but one of ordinary skill in the art will appreciated that one or more of the innovations disclosed herein may originate inside an otherwise secure/monitored network.

In this example, anomalous activity 620 has been detected by NMC 604. Accordingly, in some embodiments, NMC 604 may be arranged to perform various actions, including: classifying the anomalous activity, generating a honeypot trap based on the classification, deploying one or more honeypot traps, monitoring network traffic associated with the deployed honeypot traps, or the like.

FIG. 6B illustrates a logical schematic of system 600 if NMC 602 has engaged in automated preemptive polymorphic deception in accordance with one or more of the various embodiments. In this example, the entities in FIG. 6A are included in FIG. 6B. However, in this example, NMC 602 has deployed honeypot trap 622 in an attempt to lure the attacker towards a "safe" target that may be monitored by the NMC or other security services. In this example, honeypot trap 622 is illustrated as a computer in network 602. However, as described herein, honeypot traps are not so limited.

In one or more of the various embodiments, honeypot trap 622 may be a virtual machine instance that is deployed in a conventional or cloud computing environment. In some embodiments, in cloud computing environments, NMCs may be arranged to integrate with APIs or services provided by the cloud computing provider to automatically deploy or configure one or more honeypot traps, such as, honeypot trap 622. In some embodiments, honeypot trap 622 may be a physical device that may be dynamically configured or enabled to become visible to the attacker. For example, in one or more of the various embodiments, network configuration (e.g., software defined networks) may be employed to put honeypot trap 622 on network 602 visible or accessible to attacker 618.

In one or more of the various embodiments, if the attacker is lured by the honeypot trap to infiltrate the trap computer (e.g., honeypot trap 622), NMC 604 may be arranged to monitor the network traffic entering or leaving honeypot trap 622. In some embodiments, additional honeypot traps may be deployed based on the network activity observed by NMC 604. For example, if attacker 618 is seeking to exploit a computer in network 602 to use as a jumping off point for additional attacks, NMC 602 may detect or predict such attacks and either modify one or more deployed honeypot traps or deploy additional honeypot traps that may be arranged to thwart the subsequent attacks.

Figure 7:
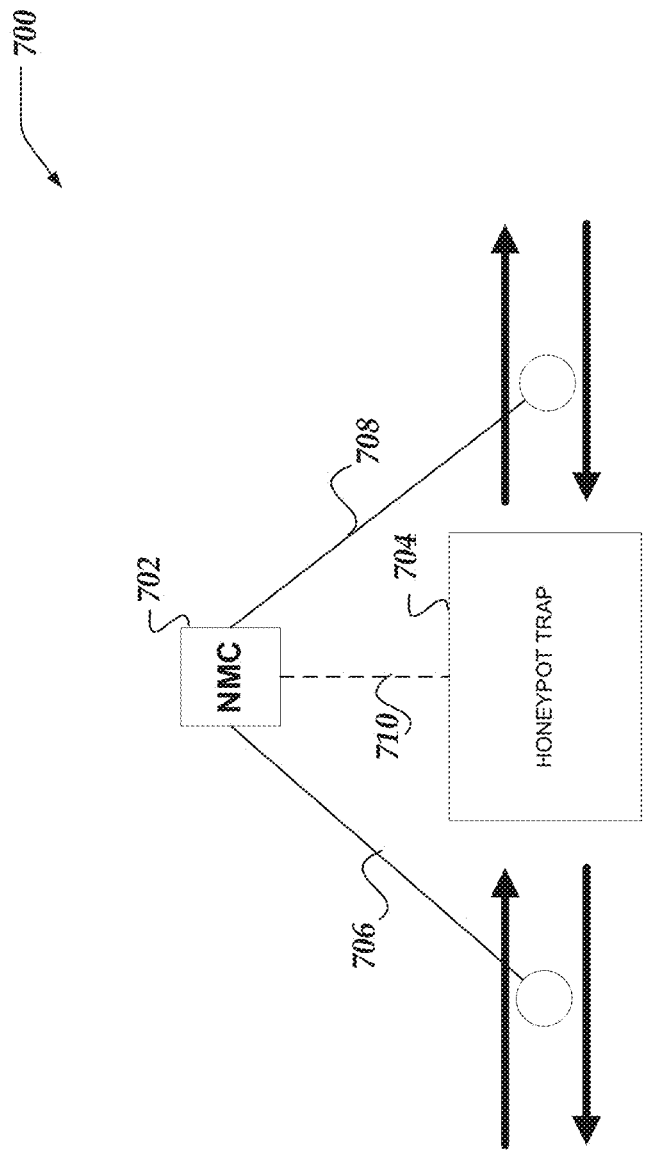
FIG. 7 illustrates a logical schematic of a system for automated preemptive polymorphic deception in accordance with one or more of the various embodiments.

FIG. 7 illustrates a logical schematic of system 700 for automated preemptive polymorphic deception in accordance with one or more of the various embodiments. In one or more of the various embodiments, system 700 includes one or more NMCs, such as, NMC 702, and one or more honeypot traps, such as, honeypot trap 704. In this example, honeypot trap 704 represents a honeypot trap deployed or configured by one or more NMCs. Accordingly, in some embodiments, NMC 704 may employ one or more observation ports, such as, observation port 706 or observation port 708 to monitor the network traffic that may be associated with honeypot trap 704.

Accordingly, in one or more of the various embodiments, NMC 704 may be arranged to monitor network activity associated with honeypot trap 704 without relying on dedicated agents, processes, or APIs. In some embodiments, honeypot traps, such as, honeypot trap 704 may be arranged to include conventional components including agents, processes, or APIs that may be discovered or detected by the attackers. For example, in some embodiments, an attack may be using one or more tools or scripts to determine various characteristics about the compromised computer/honeypot trap. For example, an attack may scan compromised computers to inventory the installed or running programs after it infiltrates a honeypot trap. Accordingly, in this example, if the honeypot trap includes one or more non-standard programs or configurations the attacker may determine it has found a honeypot trap rather than a desired/expected target.

In one or more of the various embodiments, NMCs, such as, NMC 702 may be arranged to directly interact with one or more services or programs running on honeypot trap 704. In such cases, communication path 710 may be arranged to enables communication between NMC 702 and honeypot trap 704. In some embodiments, the communication may be related to honeypot trap actions.

Figure 8A:
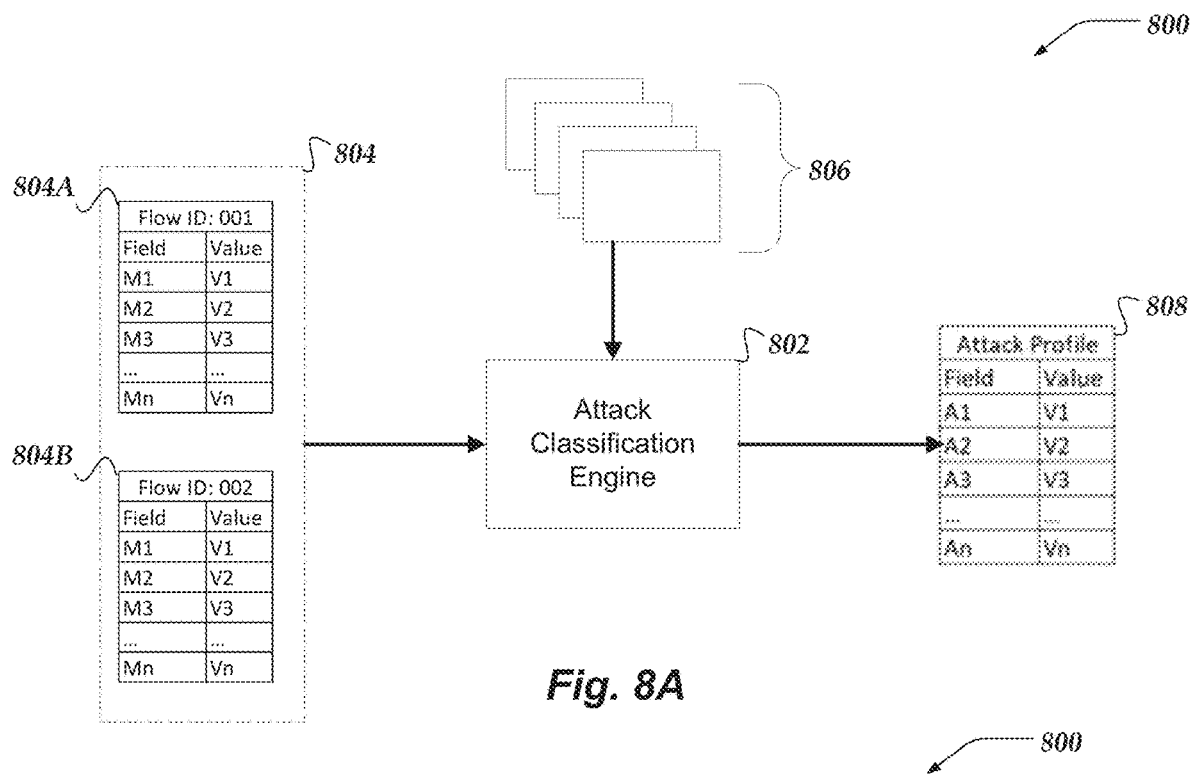
FIG. 8A illustrates a logical schematic of a portion of an NMC for using NMCs to provide automated preemptive polymorphic deception in accordance with one or more of the various embodiments.

FIG. 8A illustrates a logical schematic of a portion of NMC 800 for using NMCs to provide automated preemptive polymorphic deception in accordance with one or more of the various embodiments. In this example, NMC 800 may be considered to be a full featured NMC as described above. However, in the interest of brevity and clarity many of the components or parts of NMC 800 are omitted from FIG. 8. Though, one of ordinary skill in the art will appreciate that the portion of NMC 800 described here is at least sufficient for disclosing the innovations for automated preemptive polymorphic deception.

In one or more of the various embodiments, NMCs may be arranged to include one or more classification engines, such as, classification engine 802. In some embodiments, classification engines may be provided flow information, such as, flow information 804. In some embodiments, flow information may include information, such as, one or more flow profiles, that may be based on or derived from monitoring network flows that may be associated with one or more honeypot traps. In this example, flow profile 804A and flow profile 804B may represent information for different flows that may be associated with honeypot traps.

In one or more of the various embodiments, flow profiles, such as, flow profile 804A or flow profile 804B may be data structures that store one or more values that may be based on or derived from metrics collected by NMCs monitoring the network traffic associated with one or more honeypot traps.

In some embodiments, flow information may be continuously provided to classification engines as the information is produced. In other embodiments, NMCs may be arranged to periodically provide flow information to classification engines. In one or more of the various embodiments, classification engines, such as, classification engine 802 may be arranged to employ one or more attack models, such as, attack models 806 to determine one or more attack profiles, such as, attack profile 808 on the flow information associated with network traffic coming or going from honeypot traps. In this example, flow information 804 has flow profiles for two different flows. Accordingly, in this example, classification engine 802 may generate an attack profile, such as, attack profile 808, that includes the classification results produced by attack models 806.

In one or more of the various embodiments, attack profiles may be arranged to include results produced by some or all of the attack models. In some embodiments, values from two or more attack models may be weighted or summed together to produce a combined score. Thus, in some embodiments, the individual scores may be considered attack sub-scores, or the like.

In some embodiments, classification engines may be arranged to determine weights for individual attack models based on configuration information. Also, in some embodiments, some attack models may provide a confidence score that represents the likelihood that the its results may be accurate. In some cases, the confidence score may be represented as margins of error, probability distributions, probabilities, variances, or the like.

In one or more of the various embodiments, attack models are not limited to any particular theoretic method. Accordingly, in some embodiments, attack models may include models that may be arranged to accept flow profiles or flow profile information as input parameters and provide attack or attacker information as outputs. Further, in some embodiments, different attack models may be arranged to receive more or fewer parameters than other attack models. In one or more of the various embodiments, attack models may be based on one or more heuristics, linear regressions, other linear models, machine learning models, or the like, or combination thereof. In some embodiments, scores (sub-scores) may be arranged to be expressed in various ranges having various intervals.

Accordingly, in one or more of the various embodiments, classification engines may be arranged to employ rules or instructions that may be provided via configuration information to normalize or otherwise adjust the values to a common scale, interval, or distribution.

In one or more of the various embodiments, flow profiles may include values associated with one or more metrics collected based on network traffic monitoring performed by one or more NMCs. In some embodiments, such metrics may include various information or values associated with state information, protocol status information, security/cryptography information, tuple information, transmission rates, latency measurements, or the like. For example, in one or more of the various embodiments, flow profiles may include information that represent various states or activities, including: connection status/behavior, such as opening, closing, resets, other connection information, or the like; session information/behavior; propagation of events/actions associated with connections, sessions, or applications; application protocol features, such as, cookies, handshakes, tokens, or the like; control flow vs data flow activity; security associations; Transmission Control Protocol (TCP) flags/state; fast/slow startup; basic authorization activity; Kerberos tokens; Transport Layer Security (TLS) session tokens, x509 certificates; various temporal metrics, such as, latency, jitter, or the like.

In one or more of the various embodiments, generally, metrics or state information collected by NMCs may be transformed or formatted into values that may be included in flow profiles. In some embodiments, such values may be continuous, discrete, categorical, numeric, alphanumeric, compound (more than one sub-part), or the like, or combination thereof. Also, in some embodiments, flow profiles may be arranged to include fields that one or more attack models may ignore. Likewise, in some embodiments, one or more attack models may require one or more fields that may not be included in every flow profile. In one or more of the various embodiments, one or more attack models may include defaults to provide values for field values not provided by a given flow profile. Alternatively, in one or more of the various embodiments, some attack models may be included or excluded from determining attack characteristics depending on the fields available in the flow profiles under consideration. In one or more of the various embodiments, classification engines may be arranged to employ configuration information to determine rules for including or excluding attack models from determining attack profile information.

In one or more of the various embodiments, flow profiles may be updated on the fly as more recent or relevant information may be collected by NMCs. Also, in one or more of the various embodiments, attack profiles may be progressively updated as new or updated attack information or flow profiles are provided.

Figure 8B:
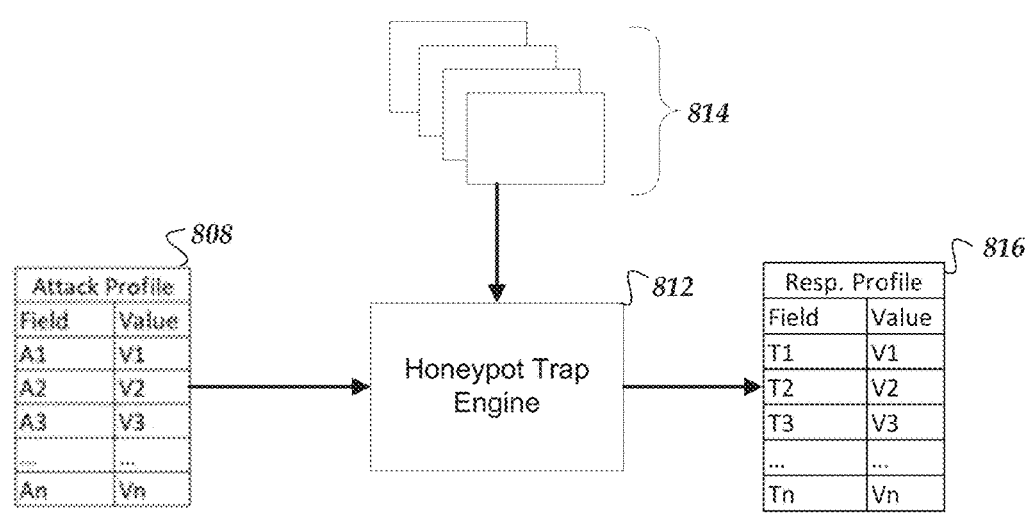
FIG. 8B illustrates a logical schematic of a portion of an NMC for using NMCs to provide automated preemptive polymorphic deception in accordance with one or more of the various embodiments.

FIG. 8B illustrates a logical schematic of a portion of NMC 800 for using NMCs to provide automated preemptive polymorphic deception in accordance with one or more of the various embodiments. In this example, NMC 800 may be considered to be a full featured NMC as described above. However, in the interest of brevity and clarity, many of the components or parts of NMC 800 are omitted from FIG. 8B. Though, one of ordinary skill in the art will appreciate that the portion of NMC 800 described here is at least sufficient for disclosing the innovations for automated preemptive polymorphic deception.

In one or more of the various embodiments, NMCs may be arranged to employ a honeypot trap engine, such as honeypot trap engine 812 to determine one or more response profiles, such as, response profiles 816 based on one or more attack profiles, such as, attack profile 808. Accordingly, in one or more of the various embodiments, honeypot trap engine 812 may be arranged to employ one or more response models, such as, response models 814 to determine one or more response profiles.

In one or more of the various embodiments, response models may be considered similar to attack models used for classifying anomalous network activity into attack profiles. However, in some embodiments, rather than including information related to the attacks, response profiles may include rules, instructions, or conditions that define or recommend various features or attributes for honeypot traps that may be arranged to address the pending attacks.

In one or more of the various embodiments, response models may be considered analytical models similar to attack models as described above. However, response models may be arranged for providing response profiles based on inputs that include attack profiles.

In some embodiments, the NMCs may be arranged to instantiate one or more honeypot traps based on response profiles 816. In some embodiments, response profiles may be provided to one or more other processes or services, including external or third-party services, that may instantiate the actual honeypot traps based on the response profile.

In one or more of the various embodiments, response profiles may include various information, such as, the type of honeypot trap, network information associated with configuring/deploying the honeypot traps, or the like. Also, in some embodiments, response profiles may include additional information, such as, applications, operating system, or the like, that should be included in a honeypot trap. For example, if an attack profile indicates that the attack is attempting to identify or compromise a customer database, the corresponding response profile may include information or instructions that indicate that honeypot trap should be a database server that appears to include customer data.

Note, the information included in a response profile may be determined based on the attack profile and the response models. In some embodiments, NMCs may be arranged to obtain response models from configuration information. Accordingly, in some embodiments, organizations may be enabled to configure how response models map attack profiles to response profiles.

Figure 8C:
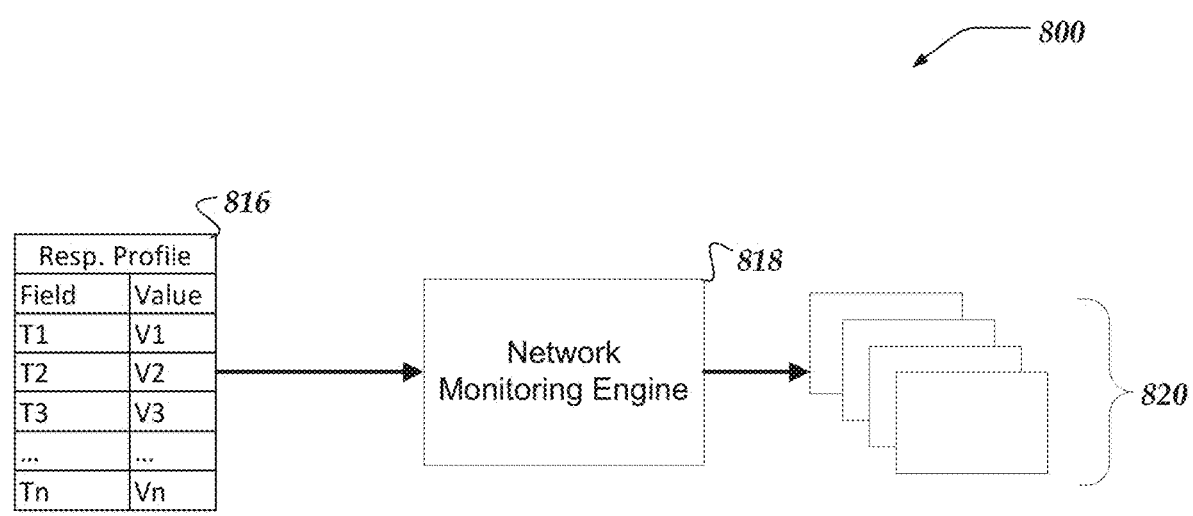
FIG. 8C illustrates a logical schematic of a portion of an NMC for using NMCs to provide automated preemptive polymorphic deception in accordance with one or more of the various embodiments.

FIG. 8C illustrates a logical schematic of a portion of NMC 800 for using NMCs to provide automated preemptive polymorphic deception in accordance with one or more of the various embodiments. In this example, NMC 800 may be considered to be a full featured NMC as described above. However, in the interest of brevity and clarity many of the components or parts of NMC 800 are omitted from FIG. 8B. Though, one of ordinary skill in the art will appreciate that the portion of NMC 800 described here is at least sufficient for disclosing the innovations for automated preemptive polymorphic deception.

In one or more of the various embodiments, network monitoring engines, such as, 818 may be arranged to employ one or more inputs, such as, response profile 816 to provide one or more honeypot traps, such as, honeypot traps 820. Accordingly, in some embodiments, network monitoring engine 818 may be arranged to employ the response profile information to provide one or more honeypot traps.

In one or more of the various embodiments, NMCs may be arranged to communicate with other services or providers to instantiate the honeypot traps. Accordingly, in some embodiments, NMCs may be arranged to employ information included in response profiles to determine one or more commands or signals that enable the desired honeypot traps to be deployed in the monitored network environment.

In some embodiments, the particular commands or signals may depend on one or more characteristics of network environment. For example, different cloud computing providers may have different commands or APIs. Likewise, for example, different operation system or applications may require specific commands or configurations. Accordingly, in some embodiments, NMCs may determine the commands, signal, configuration, or the like, for a given honeypot trap based on configuration information. For example, in some embodiments, if response profile 816 requires the provisional of a mock or decoy Microsoft Domain Controller, NMCs may employ configuration information to determine the specific commands or signals for deploying the honeypot trap Domain Controller. For example, in some embodiments, this may include defining the identity or location of predefined virtual machine images or containers that are compatible with the monitored networking environment.

Generalized Operations

Figure 9:
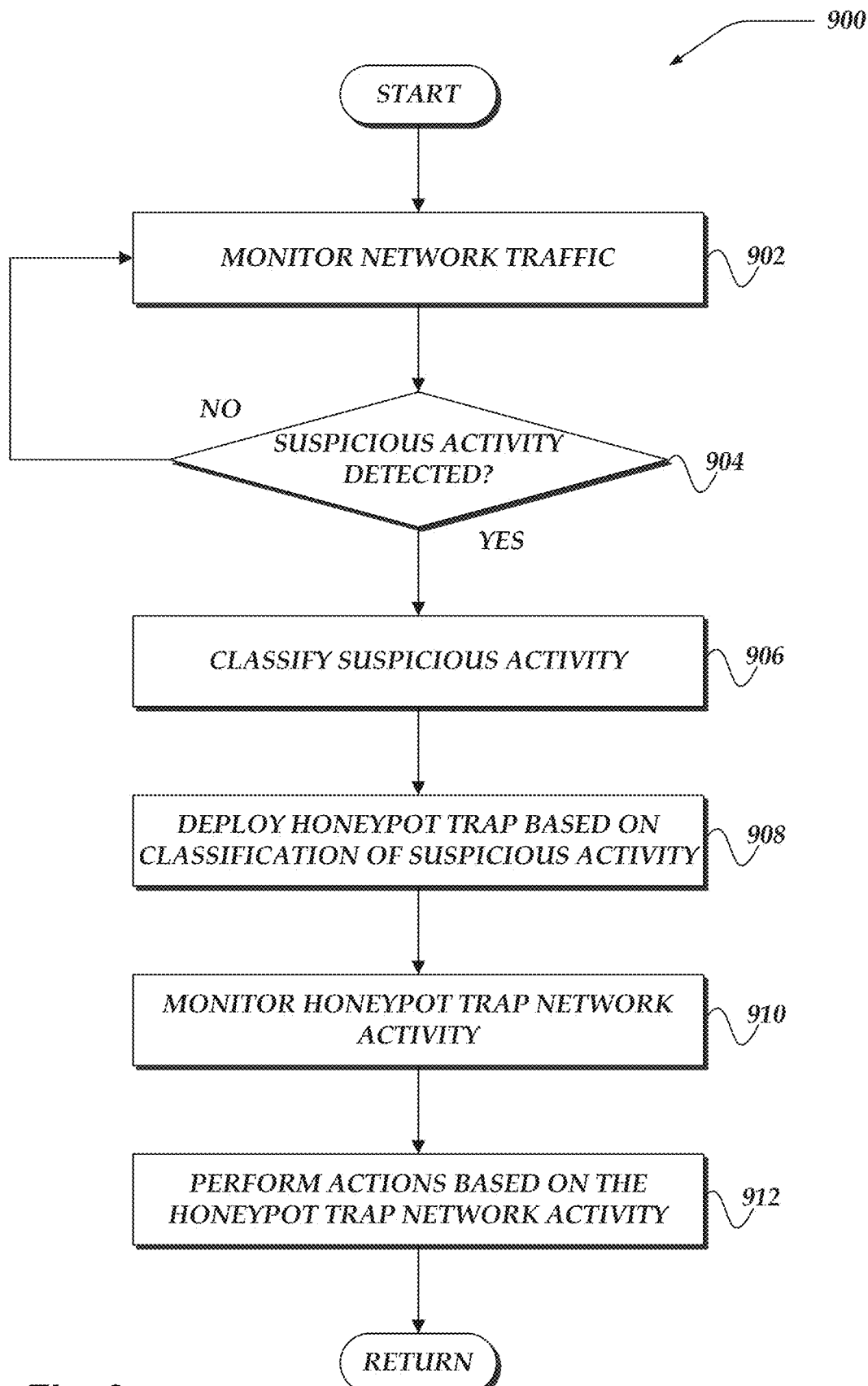
FIG. 9 illustrates an overview flowchart of a process for automated preemptive polymorphic deception in accordance with one or more of the various embodiments.
Figure 10:
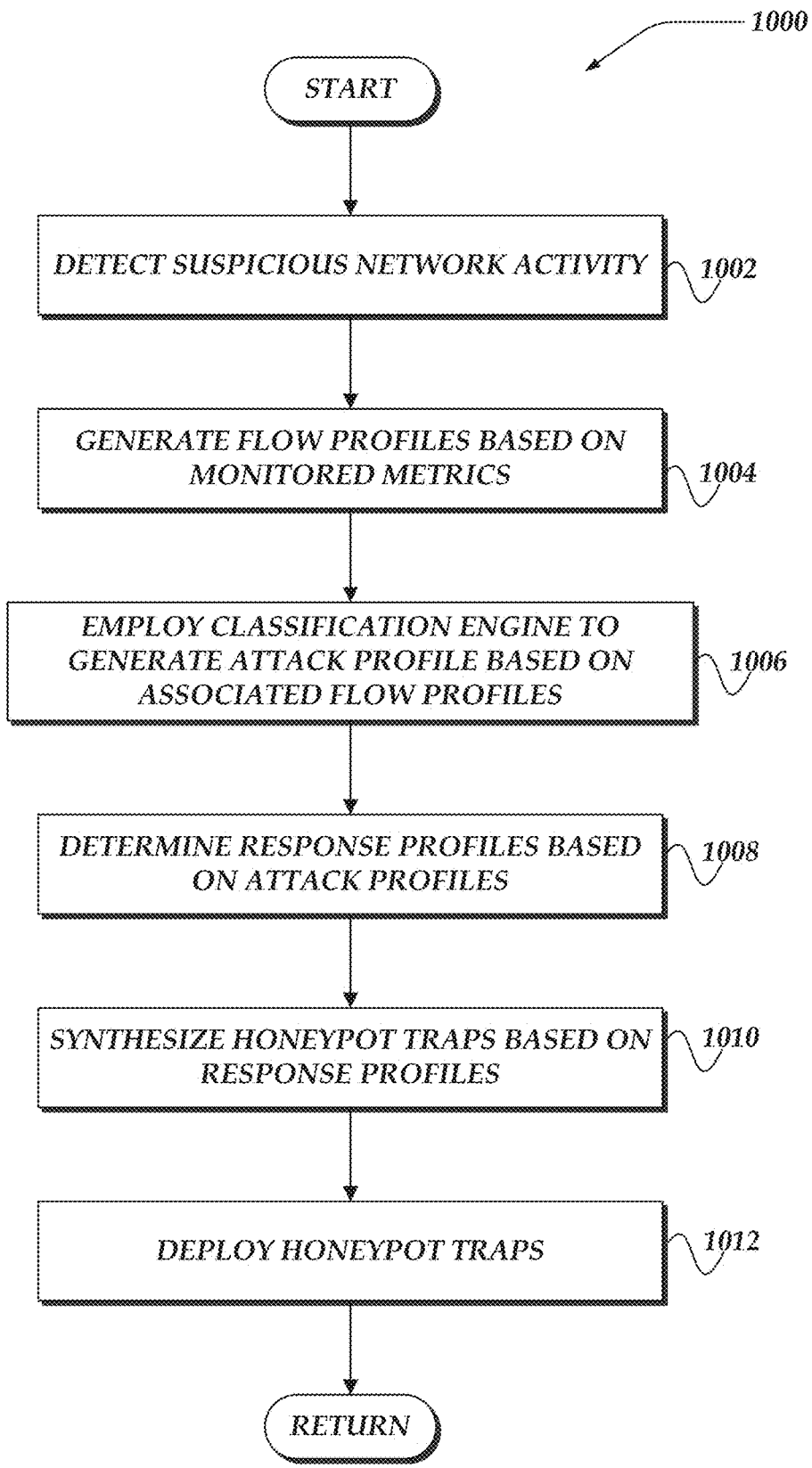
FIG. 10 illustrates a flowchart of a process for automated preemptive polymorphic deception in accordance with one or more of the various embodiments.
Figure 11:
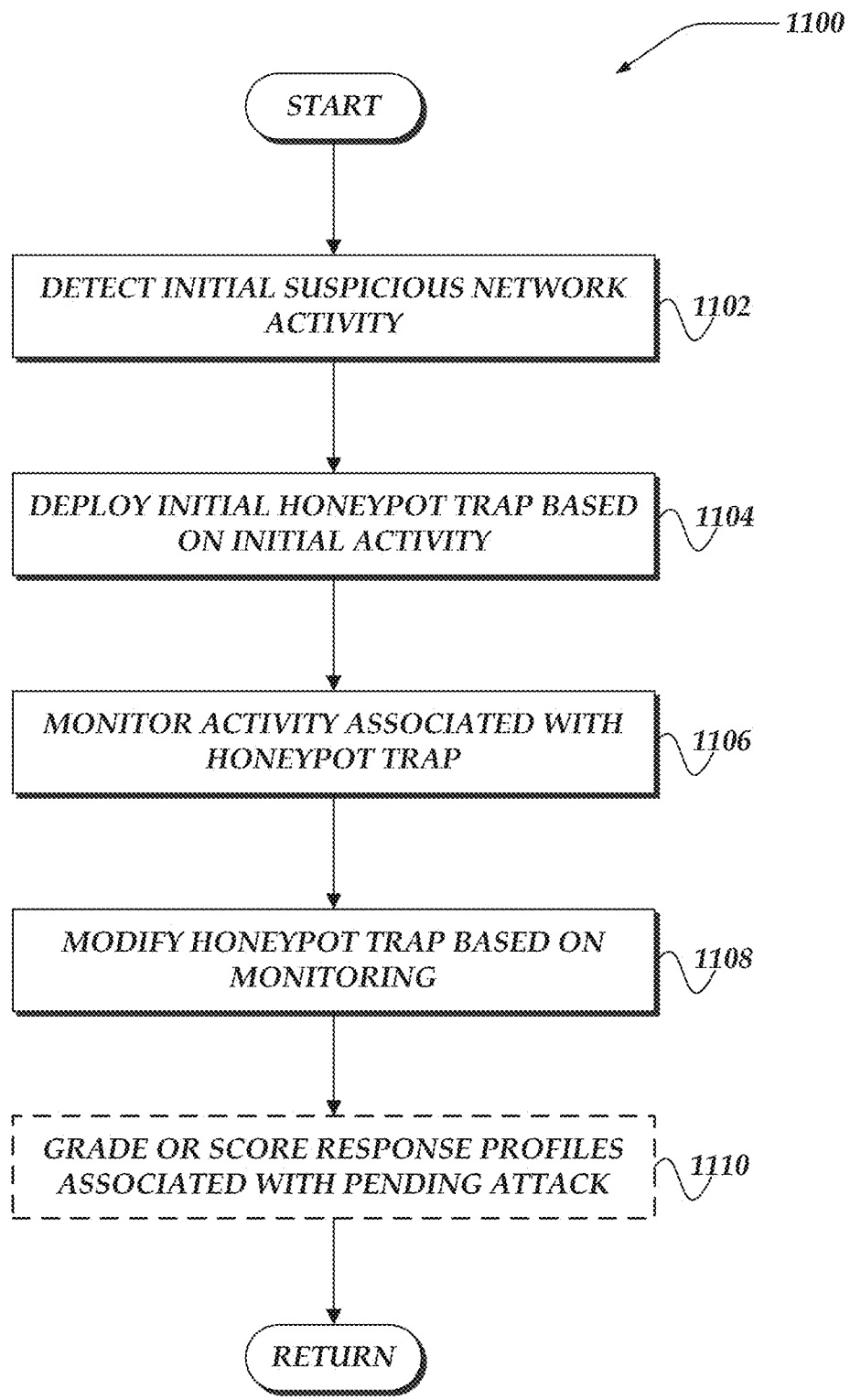
FIG. 11 illustrates a flowchart of a process for automated preemptive polymorphic deception in accordance with one or more of the various embodiments.

FIGS. 9-11 represent generalized operations for automated preemptive polymorphic deception in accordance with one or more of the various embodiments. In one or more of the various embodiments, processes 900, 1000, and 1100 described in conjunction with FIGS. 9-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-11 may be used for automated preemptive polymorphic deception in accordance with at least one of the various embodiments or architectures such as those described in conjunction with FIGS. 4-8. Further, in one or more of the various embodiments, some or all of the actions performed by processes 900, 1000, and 1100 may be executed in part by network monitoring engine 322, honeypot engine 324, classification engine 326, or the like, running on one or more processors of one or more network computers.

FIG. 9 illustrates an overview flowchart of process 900 for automated preemptive polymorphic deception in accordance with one or more of the various embodiments. After a start block, at block 902, in one or more of the various embodiments, NMCs may be arranged to monitor network traffic that may be associated with one or more networks. As described herein, NMCs may be arranged to monitor network traffic in a network environment. Accordingly, in some embodiments, NMCs may collect a variety of metrics associated with the one or more flows that comprise network traffic in monitored networks.

At decision block 904, in one or more of the various embodiments, if anomalous network activity may be detected, control may flow to block 906; otherwise, control may loop back to block 902. In one or more of the various embodiments, NMCs may be arranged to apply various threshold tests, recognizers, pattern matching, protocol state machine, heuristics, machine learning derived models, or the like, identify anomalous network activity in the monitored networks.

At block 906, in one or more of the various embodiments, NMCs may be arranged to classify the anomalous activity. In one or more of the various embodiments, NMCs may include one or more classification engines that may be arranged to determine if anomalous activity may be associated with an attack on the monitored network. In some embodiments, network activity associated with the anomalous activity may be categorized into flows. Thus, in some embodiments, NMCs may provide flow profiles that describe one or more characteristics of the network traffic associated with the anomalous activity. In some embodiments, a flow profile may be associated one or more network flows. For example, if one or more flows are related flows, in some embodiments, information for each related flow may be included in one flow profile. In some embodiments, a flow profile may be arranged to include one or more other flow profiles, also known as, flow sub-profiles.

Accordingly, in one or more of the various embodiments, NMCs may be arranged to classify or categorize anomalous activity into one or more attack profiles that may define or describe particular attacks. In some embodiments, the same flow profile may match with more than one attack profile.

At block 908, in one or more of the various embodiments, NMCs may be arranged to deploy one or more honeypot traps based on the classification of the anomalous activity. In one or more of the various embodiments, NMCs may be arranged to determine one or more responses to the determined attack profiles. In one or more of the various embodiments, the one or more responses may include provisioning or deploying one or more honeypot traps directed to the one or more attacks. In some embodiments, NMCs may be arranged to provide response profiles that include the instructions or rules regarding the provisioning of honeypot traps and the management thereof.

At block 910, in one or more of the various embodiments, NMCs may be arranged to monitor the network activity associated with the one or more honeypot traps. In one or more of the various embodiments, NMCs may be arranged to observe how an attack interacts with honeypot traps based on monitoring the honeypot traps to observe the ingress or egress of network traffic associated with the honeypot traps. Accordingly, in one or more of the various embodiments, NMCs may be arranged to determine information about the attack or attackers absent a detectable presence on honeypot traps. Accordingly, in one or more of the various embodiments, employ NMCs to monitor honeypot traps rather than relying on onboard agents or diagnostic reduce the attackers ability to discern that they are engaged with honeypot traps. For example, in one or more of the various embodiments, a conventional honeypot trap may include an onboard agent or specific configuration that a sophisticated attacker may detect. In contrast, in one or more of the various embodiments, analyzing attacker engagement with the honeypot traps based on monitoring of network traffic outside the honeypot traps may increase the difficultly for attackers to detect that they are engaging with honeypot traps.

At block 912, in one or more of the various embodiments, NMCs may be arranged to perform one or more actions based on the network activity associated with the honeypot traps. In one or more of the various embodiments, NMCs may be arranged to provision additional honeypot traps, generate reports, send notifications, or the like, based on information determined from monitoring the honeypot traps.

In one or more of the various embodiments, NMCs may employ one or more response profiles that define the various actions to perform based on the network activity associated with the honeypot traps. Accordingly, in one or more of the various embodiments, as conditions defined in a response profile are met, NMCs may be triggered to perform one or more associated actions. In some embodiments, one or more of the actions may be defined via configuration information.

Next, in one or more of the various embodiments, control may be returned to a calling process.

FIG. 10 illustrates a flowchart of process 1000 for automated preemptive polymorphic deception in accordance with one or more of the various embodiments. After a start block, at block 1002, in one or more of the various embodiments, NMCs may be arranged to detect anomalous network activity based on monitoring network traffic that may be associated with one or more networks.

At block 1004, in one or more of the various embodiments, NMCs may be arranged to generate one or more flow profiles based on metrics associated with the monitored network traffic. As described above, in some embodiments, NMCs may be arranged to generate flow profiles that represent one or more characteristics of monitored network traffic. In some embodiments, flow profiles may include one or more fields that have values based on one or more metrics determined by NMCs. In some embodiments, flow profiles or portions of flow profiles may be arranged to conform to the input requirements for one or more classification engines.

At block 1006, in one or more of the various embodiments, NMCs may be arranged to employ a classification engine to generate one or more attack profiles based on the one or more flow profiles. In one or more of the various embodiments, flow profiles or portions of flow profiles may be provided as inputs to one or more classification engines that may employ the inputs to determine if the anomalous activity associated with the flow profile may be an attack.

Accordingly, in one or more of the various embodiments, classification engines may be arranged to employ one or more attack models to determine if the flow profiles are associated with attack. In some embodiments, information about attacks may be represented as attack profiles. Accordingly, in one or more of the various embodiments, classification engines may be arranged to map attack profiles to flows profiles based on one or more attack models. In some embodiments, the each individual mapping of attack profiles to flow profiles may include a confidence score, or the like, that indicates how close a given attack model matches the one or more flow profiles associated with the anomalous activity.

In one or more of the various embodiments, one or more attack models employed by classification engines may be machine learning models. In some embodiments, such models may be generated (e.g., trained) based on captured network traffic or responses or results of past attacks.

In some embodiments, attack models may be arranged to include one or more heuristics or otherwise ad-hoc conditions to match anomalous activity to a given attack profile. In some embodiments, one or more values in a flow profile may map directly to an attack profile. For example, in some embodiments, anomalous activity that includes attempts to probe a TCP port assigned to a known application (e.g., email server, database server, or the like) may be automatically mapped to an attack profile that is configured for attacks against that specific application.

Also, in one or more of the various embodiments, more than one attack profile may be mapped to anomalous activity. In some embodiments, two or more attack profiles may be deliberately arranged to overlap such as the same anomalous activity may be mapped to more than one attack profiles each with a high confidence score.

At block 1008, in one or more of the various embodiments, NMCs may be arranged to determine one or more response profiles based on the attack profiles. As described above, response profiles may be comprised of data structures that include information that defines or prescribes one or more characteristics of the honeypot trap response to a pending attack.

In one or more of the various embodiments, NMCs may be arranged to employ additional information, such as, flow profiles, user information, network environment information, information regarding authorized applications or activity, or the like, to determine response profiles. In some embodiments, some of the information used for determining response profiles may be provided by other services, including external or third party services.

In one or more of the various embodiments, response profiles may include instructions, rules, workflows, for the like, that drive the provisioning or deployment of honeypot traps directed to one or more attack profiles. In some embodiments, NMCs may be arranged to map response profiles to attack profile using static/fixed maps or real-time determination based on rules, instructions, or the like, provided via configuration information. In some embodiments, NMCs may be arranged to employ machine learning techniques to train or create machine learning models to select or recommend one or more response profiles based on inputs, such as, attack profiles, flow profiles, or the like.

In one or more of the various embodiments, NMCs may be arranged to employ information associated with the current state of the monitored computing environment. In some embodiments, NMCs may combine one or more metrics determined based on network monitoring with one or more performance/utilization metrics provided by other services or processes. For example, in some embodiments, a cloud computing environment may provide APIs for accessing perform or activity information that may be applied to the selection of response profiles.

Also, in some embodiments, one or more response profiles may be comprised of one or more other response profiles (e.g., response sub-profiles) that may be compiled into a single response profile envelope. In one or more of the various embodiments, a response profile may include sub-profiles directed to different kinds of attacks or different phases of the same attack.

Also, in some embodiments, more than one attack profile may be provided. In some embodiments, multiple attack profiles may represent that the classification engine is unable to pin-point a single best attack profile candidate. Or, similarly, in some cases, classification engines may predict that the underlying anomalous activity may employ a variety of attack strategies that may require different responses.

At block 1010, in one or more of the various embodiments, NMCs may be arranged to generate one or more honeypot traps based on the response profiles. In one or more of the various embodiments, the response profiles may include instructions, rules, scripts, or the like, that may be provided via configuration information. Accordingly, in some embodiments, organizations may be enabled to adapt response to their local requirements.

In one or more of the various embodiments, response profiles may include conditional response actions, such that particular actions may be executed if one or more conditions are met. Likewise, in one or more of the various embodiments, response profiles may be arranged to include definitions for one or more honeypot traps, one or more network configurations, or the like.

At block 1012, in one or more of the various embodiments, NMCs may be arranged to deploy the one or more honeypot traps. As described above, one or more response profiles may define the honeypot traps that should be provisioned or deployed. Likewise, in one or more of the various embodiments, response profiles may include one or more network configurations that may be applied.

Next, in one or more of the various embodiments, control may be returned to a calling process.

FIG. 11 illustrates a flowchart of process 1100 for automated preemptive polymorphic deception in accordance with one or more of the various embodiments. After a start block, at block 1102, in one or more of the various embodiments, NMCs may be arranged to detect anomalous network activity based on monitoring network traffic that may be associated with one or more networks. As described above, NMCs may be arranged to monitor the characteristics of network activity to identify anomalous activity.

At block 1104, in one or more of the various embodiments, NMCs may be arranged to deploy one or more honeypot traps based on the initial anomalous network activity. As described above, NMCs may be arranged to provide one or more honeypot traps that may be selected or created based on one or more characteristics of the network traffic that may be associated with the anomalous activity. In some embodiments, the network traffic associated with detected anomalous activity may be represented by one or more flow profiles that may be mapped to one or more response profiles. Accordingly, in some embodiments, the NMCs may employ information or instructions included in the response profiles to deploy one or more honeypot traps.

In one or more of the various embodiments, NMCs may be arranged to deploy two or more honeypot traps that may be considered exploratory in nature. Accordingly, in one or more of the various embodiments, the two or more honeypot traps may be deployed to determine more information about the attacks or attackers. In one or more of the various embodiments, if multiple types of honeypot traps are deployed, observing or measuring the attractiveness of the different types of honeypot traps based on how well they attract the attackers may provide insights into the source, goals, capabilities, sophistication, or the like, of the attackers. For example, if the attackers are attracted to a trap that mimics an employee database rather than a web server, it may indicate that the attackers are looking for employee personal information rather than attempting to deface an organization's website.

At block 1106, in one or more of the various embodiments, NMCs may be arranged to monitor network activity associated with the deployed honeypot traps. In one or more of the various embodiments, monitoring the network activity associated with the deployed honeypot traps enables NMCs to determine if attackers have engaged with the honeypot traps. Further, in some embodiments, because deploying honeypot traps may include providing software defined overlay networks dedicated to trapping attackers, the NMCs may be arranged to monitor activity occurring in the overlay network to learn more about the attackers or the attacks.

At block 1108, in one or more of the various embodiments, NMCs may be arranged to modify one or more of the one or more honeypot traps based on monitored network traffic. In one or more of the various embodiments, because the monitoring of the honeypot traps may enable additional information about a pending attack to be discovered. Accordingly, in some embodiments, NMCs may be arranged to alter the honeypot traps to account for the newly discovered or confirmed information. In some embodiments, altering or modifying honeypot traps may include providing different honeypot traps in additional to previously deployed honeypot traps. Also, in some embodiments, altering or modifying honeypot traps may include modify one or more currently deployed honeypot traps.

In one or more of the various embodiments, modifying honeypot traps may include modifying one or more characteristics of the network configuration that may be associated with one or more honeypot traps. In some embodiments, modifying honeypot traps may include sending commands or messages to one or more applications that may be running on a honeypot trap computer.

In one or more of the various embodiments, modifying honeypot traps may include adding additional honeypot traps based on predicted actions associated with pending attacks. For example, in one or more of the various embodiments, a honeypot trap strategy may include two or more layers that may be adapted to pending attacks. In some embodiments, flow profiles associated with the pending attack may be classified in attack profiles that may be used to determine additional or different response profiles to responds to learned information associated with pending attacks.

In some embodiments, learned information associated with pending attacks may be based on previous attacks. Also, in one or more of the various embodiments, learned information associated with pending attacks may be based on information learned from attacks on other networks. For example, in some embodiments, NMCs may be arranged to employ database that includes flow profiles and response profiles.

At block 1110, in one or more of the various embodiments, optionally, NMCs may be arranged to grade or score one or more response profiles associated with one or more pending attacks. In some embodiments, one or more response profile may be graded based on their effectiveness against various attacks (e.g., attack profiles). In some embodiments, NMCs may be arranged to automatically grade one or more response profiles based on how attacks respond to the honeypot traps deployed accordingly to the one or more response profiles. For example, in some embodiments, if honeypot traps deployed based on response profile are avoided or ignored by attacks, the response profile may be downgraded for the attack profiles or flow profiles that triggered the response profile in the first place. Likewise, in some embodiments, NMCs may be arranged to provide a user-interface that enables users to manual grade or score response profiles.

For example, in some embodiments, NMCs may be arranged to monitor the portions of the network traffic associated with a honeypot trap to determine how many attacks may be attracted to the honeypot trap. Accordingly, in some embodiments, the honeypot trap may be scored based on the number of attracted attacks such that the honeypot trap may be scored higher than one or more honeypot traps that attract fewer attackers and the honeypot may be scored lower than one or more other honeypot traps that attract more attackers.

Note, this block is indicated as being optional because in some embodiments NMCs may be arranged to omitted this step.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic in one or more networks using one or more network computers, wherein execution of instructions by the one or more network computers causes performance of actions, comprising:
   generating a plurality of honeypot traps that include false information to mimic one or more targets of one or more attacks in the one or more networks, wherein a plurality of other honeypot traps are generated to mimic the one or more targets based on ingress and egress of the monitored traffic associated with the plurality of honeypot traps;
   determining one or more correlations between one or more metrics for ingress and egress information for monitored network traffic that is outside of the plurality of honeypot traps and the one or more other honeypot traps;
   generating one or more configurations for the plurality of honeypot traps and the plurality of other honeypot traps based on the one or more correlations, wherein the use of the one or more correlations causes reduction in complexity for generation of the one or more configurations and increases complexity for detection by one or more attackers of monitored mimic behavior by the plurality of honeypot traps and the plurality of other honeypot traps;
   generating one or more reports that include localization features and characteristic information on one or more subsequent attacks on the plurality of honeypots and the plurality of other honeypots.

2. The method of claim 1, wherein the generation of the plurality of honeypot traps further comprises:
   employing one or more classifications of one or more anomalous events associated with the one or more attacks to generate the plurality of honeypot traps.

3. The method of claim 1, further comprising:
classifying one or more anomalous events associated with the one or more attacks based on monitored network traffic associated with a plurality of entities in one or more networks and one or more attack models.

4. The method of claim 1, wherein the generation of the plurality of honeypot traps further comprises:
generating one or more honeypot traps based on one or more anomalous events associated with the one or more attacks on the one or more targets, wherein the plurality of other honeypot traps are generated based on ingress and egress of monitored network traffic associated with one or more subsequent attacks on the one or more honeypot traps.

5. The method of claim 1, further comprising:
generating one or more secondary honeypot traps based on one or more subsequent attacks on the plurality of honeypots.

6. The method of claim 1, further comprising:
modifying one or more of the plurality of honeypot traps based on one or more subsequent attacks on the one or more of the plurality of honeypots.

7. The method of claim 1, further comprising:
determining network environment information associated with the one or more attacks on the one or more targets by one or more entities.

8. A network monitoring computer (NMC) for monitoring network traffic between one or more computers in a network, comprising:
a memory that stores at least instructions; and
one or more processors that execute instructions that cause performance of actions, including:
generating a plurality of honeypot traps that include false information to mimic one or more targets of one or more attacks in the one or more networks, wherein a plurality of other honeypot traps are generated to mimic the one or more targets based on ingress and egress of the monitored traffic associated with the plurality of honeypot traps;
determining one or more correlations between one or more metrics for ingress and egress information for monitored network traffic that is outside of the plurality of honeypot traps and the one or more other honeypot traps;
generating one or more configurations for the plurality of honeypot traps and the plurality of other honeypot traps based on the one or more correlations, wherein the use of the one or more correlations causes reduction in complexity for generation of the one or more configurations and increases complexity for detection by one or more attackers of monitored mimic behavior by the plurality of honeypot traps and the plurality of other honeypot traps;
generating one or more reports that include localization features and characteristic information on one or more subsequent attacks on the plurality of honeypots and the plurality of other honeypots.

9. The network computer of claim 8, wherein the generation of the plurality of honeypot traps further comprises:
employing one or more classifications of one or more anomalous events associated with the one or more attacks to generate the plurality of honeypot traps.

10. The network computer of claim 8, further comprising:
classifying one or more anomalous events associated with the one or more attacks based on monitored network traffic associated with a plurality of entities in one or more networks and one or more attack models.

11. The network computer of claim 8, wherein the generation of the plurality of honeypot traps further comprises:
generating one or more honeypot traps based on one or more anomalous events associated with the one or more attacks on the one or more targets, wherein the plurality of other honeypot traps are generated based on ingress and egress of monitored network traffic associated with one or more subsequent attacks on the one or more honeypot traps.

12. The network computer of claim 8, further comprising:
generating one or more secondary honeypot traps based on one or more subsequent attacks on the plurality of honeypots.

13. The network computer of claim 8, further comprising:
modifying one or more of the plurality of honeypot traps based on one or more subsequent attacks on the one or more of the plurality of honeypots.

14. The network computer of claim 8, further comprising:
determining network environment information associated with the one or more attacks on the one or more targets by one or more entities.

15. A processor readable non-transitory storage media that includes instructions for monitoring network traffic in one or more networks using one or more network monitoring computers, wherein execution of the instructions by one or more processors for the one or more networking monitoring computers causes performance of actions, comprising:
generating a plurality of honeypot traps that include false information to mimic one or more targets of one or more attacks in the one or more networks, wherein a plurality of other honeypot traps are generated to mimic the one or more targets based on ingress and egress of the monitored traffic associated with the plurality of honeypot traps;
determining one or more correlations between one or more metrics for ingress and egress information for monitored network traffic that is outside of the plurality of honeypot traps and the one or more other honeypot traps;
generating one or more configurations for the plurality of honeypot traps and the plurality of other honeypot traps based on the one or more correlations, wherein the use of the one or more correlations causes reduction in complexity for generation of the one or more configurations and increases complexity for detection by one or more attackers of monitored mimic behavior by the plurality of honeypot traps and the plurality of other honeypot traps;
generating one or more reports that include localization features and characteristic information on one or more subsequent attacks on the plurality of honeypots and the plurality of other honeypots.

16. The processor readable non-transitory storage media of claim 15, wherein the generation of the plurality of honeypot traps further comprises:
employing one or more classifications of one or more anomalous events associated with the one or more attacks to generate the plurality of honeypot traps.

17. The processor readable non-transitory storage media of claim 15, further comprising:
classifying one or more anomalous events associated with the one or more attacks based on monitored network traffic associated with a plurality of entities in one or more networks and one or more attack models.

18. The processor readable non-transitory storage media of claim 15, further comprising:
generating one or more honeypot traps based on one or more anomalous events associated with the one or more attacks on the one or more targets, wherein the plurality of other honeypot traps are generated based on ingress and egress of monitored network traffic associated with one or more subsequent attacks on the one or more honeypot traps.

19. The processor readable non-transitory storage media of claim 15, further comprising:
generating one or more secondary honeypot traps based on one or more subsequent attacks on the plurality of honeypots.

20. The processor readable non-transitory storage media of claim 15, further comprising:
modifying one or more of the plurality of honeypot traps based on one or more subsequent attacks on the one or more of the plurality of honeypots.

* * * * *